U S009858771B2

(12) United States Patent
Kelly et al.

(10) Patent No.: US 9,858,771 B2
(45) Date of Patent: Jan. 2, 2018

(54) DETECTOR DEVICES FOR PRESENTING NOTIFICATIONS AND SUPPORTING CONTEXT INFERENCES

(71) Applicant: Belkin International, Inc., Playa Vista, CA (US)

(72) Inventors: Francis Michael Kelly, Thousand Oaks, CA (US); Ryan Yong Kim, Rolling Hills Estates, CA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 295 days.

(21) Appl. No.: 14/755,777

(22) Filed: Jun. 30, 2015

(65) Prior Publication Data

US 2016/0042283 A1 Feb. 11, 2016

Related U.S. Application Data

(63) Continuation of application No. 14/453,350, filed on Aug. 6, 2014, now Pat. No. 9,111,221, which is a
(Continued)

(51) Int. Cl.
*G05B 15/00* (2006.01)
*G08B 5/22* (2006.01)
(Continued)

(52) U.S. Cl.
CPC ............ *G08B 5/22* (2013.01); *G06N 5/04* (2013.01); *G06N 5/043* (2013.01); *G06N 99/005* (2013.01); *G08B 13/19* (2013.01); *H04W 88/00* (2013.01)

(58) Field of Classification Search
USPC ............... 340/541, 539.26, 565, 286.02; 705/14.66; 706/12, 46, 47; 726/30;
(Continued)

(56) References Cited

U.S. PATENT DOCUMENTS 5,812,422 A 9/1998 Lyons
9,111,221 B1 * 8/2015 Kelly et al. ............... 340/541
(Continued)

OTHER PUBLICATIONS

Notice of Allowance dated Sep. 2, 2015 for U.S. Appl. No. 14/452,832, 12 pages.
(Continued)

*Primary Examiner* — Brent Swarthout
(74) *Attorney, Agent, or Firm* — Kilpatrick Townsend & Stockton LLP

(57) ABSTRACT

Techniques can relate to generating inferences based on network devices' measuring of environmental data points and generating notifications or controlling devices based on the inferences. One or more environmental data points can be accessed. Each environmental data point in the one or more environmental data points can include one measured by a detector device and that characterizes a corresponding environmental stimulus. At least one of the environmental data points can be indicative of a light intensity or power usage measured by a first device. An inference can be generated based on the one or more environmental data points. A notification or device control can be identified based on the inference. A communication can be generated and transmitted to a second device. Receipt of the communication can cause the second device to present the notification or to be controlled in accordance with the device control.

20 Claims, 14 Drawing Sheets

Related U.S. Application Data continuation of application No. 14/452,832, filed on Aug. 6, 2014, now Pat. No. 9,224,277.

(51) Int. Cl.
  *H04W 88/00* (2009.01)
  *G06N 5/04* (2006.01)
  *G06N 99/00* (2010.01)
  *G08B 13/19* (2006.01)

(58) Field of Classification Search
  USPC .................................. 455/456.1; 700/19, 276
  See application file for complete search history.

(56) References Cited

U.S. PATENT DOCUMENTS

| | | |
|---|---|---|
| 9,224,277 B1 | 12/2015 | Kelly et al. |
| 9,253,455 B1 | 2/2016 | Harrison et al. |
| 2009/0319569 A1 | 12/2009 | Parks |
| 2010/0148672 A1 | 6/2010 | Hopper |
| 2010/0289643 A1 | 11/2010 | Trundle et al. |
| 2011/0230986 A1 | 9/2011 | Lafortune et al. |
| 2012/0022675 A1 | 1/2012 | Kristjansson et al. |
| 2013/0022132 A1 | 1/2013 | Paulsen et al. |
| 2013/0109404 A1 | 5/2013 | Husney |
| 2014/0074307 A1 | 3/2014 | Matsuyama et al. |
| 2014/0122378 A1 | 5/2014 | Swaminathan et al. |
| 2014/0122396 A1 | 5/2014 | Swaminathan et al. |
| 2014/0128021 A1 | 5/2014 | Walker et al. |
| 2014/0222241 A1 | 8/2014 | Ols |
| 2014/0266669 A1 | 9/2014 | Fadell et al. |
| 2015/0102928 A1 | 4/2015 | Sirotkin |
| 2015/0105911 A1 | 4/2015 | Slupik et al. |
| 2015/0156074 A1 | 6/2015 | Yamada |
| 2015/0177705 A1 | 6/2015 | Mylet |
| 2016/0078731 A1 | 3/2016 | Kelly et al. |
| 2016/0255697 A1* | 9/2016 | Bhide ...................... H02J 9/06 315/161 |
| 2017/0124830 A1* | 5/2017 | Fadell ................... G08B 19/00 |

OTHER PUBLICATIONS

First-Action Interview Pilot Program Pre-Interview Communication for U.S. Appl. No. 14/949,111, dated Mar. 30, 2016, 7 pages.
First-Action Interview Pilot Program Pre-Interview Communication for U.S. Appl. No. 14/452,832, dated Jan. 20, 2015, 5 pages.
First-Action Interview Pilot Program Pre-Interview Communication for U.S. Appl. No. 14/453,350, dated Dec. 12, 2014, 5 pages.
First Action Interview Office Action Summary for U.S. Appl. No. 14/453,350, dated Feb. 5, 2015, 3 pages.
Final Office Action for U.S. Appl. No. 14/453,350, dated Feb. 20, 2015, 10 pages.
Notice of Allowance for U.S. Appl. No. 14/453,350, dated Apr. 24, 2015, 5 pages.
Non-Final Office Action dated May 28, 2015 for U.S. Appl. No. 14/452,832, 12 pages.

* cited by examiner

DETECTOR DEVICES FOR PRESENTING NOTIFICATIONS AND SUPPORTING CONTEXT INFERENCES

CROSS-REFERENCE TO RELATED APPLICATIONS

This application is a continuation of U.S. application Ser. No. 14/453,350, filed on Aug. 6, 2014, now U.S. Pat. No. 9,111,221, which is a continuation of U.S. application Ser. No. 14/452,832, filed on Aug. 6, 2014, now U.S. Pat. No. 9,224,277, which is hereby incorporated by reference in its entirety for all purposes.

FIELD

This disclosure relates in general to a detector device that also is configured to conditionally present one or more notifications and to using data detected by the detector device to infer a context and/or execute a rule (e.g., for controlling the device or another device).

BACKGROUND

People are surrounded by a dynamic mix of many stimuli. People are adapted to continually adapt our actions based on the current mix. For example, as a room becomes darker, a person turns on a light. As a room becomes colder, a person turns on the heat. However, such responsive actions are inconvenient. Further, due to the inconvenience or a particular circumstance, there are times when a person cannot or chooses not to perform the appropriate action. In such a case, an appeal of an environment can suffer.

SUMMARY

Various detecting devices have been developed. However, the utility of such devices has been limited for a variety of reasons. For example, a sensing region of a device is typically constrained to a rather small, local region. As another example, a reach of a detecting device is frequently limited to controlling operations within the device itself. As yet another example, a consequence of a particular detection is typically fixed, such that a user must either choose to use the detector with an inflexible rule or to avoid it altogether.

In certain embodiments, techniques relate to expanding the utility of detector devices to support presentation of dynamic and/or custom notifications and/or to support inferences forming the basis of device-control rules. In one instance, a detector device (e.g., a light sensor) includes a surface (e.g., a lens). The detector device can be configured to detect a characteristic on an outside of the surface. Additionally, however, one or more light sources can be positioned on an inside of the surface, and the light can be used to present a notification on the surface of the device to a user. The notification can be conveyed by a mere presence of a light stimulus, a color and/or intensity of a light stimulus, and/or other stimulus detail (e.g., a shape, included graphic, and/or included text). Whether to present a notification and/or a selection of a notification or notification characteristic can be based on data sensed by the detector device and/or other data (e.g., which can include data sensed from another affiliated detector device, an operation characteristic of an affiliated device, data from a remote source, etc.).

For example, an intensity of a light emitted by a surface on a detector device can be inversely or positively correlated with an intensity of light detected by the device. As another example, a red light can be conditionally (e.g., and diffusely) presented surface of a detector device when a power-consumption variable, based on data collected by one or more power monitors, exceeds a threshold. As yet another example, a number identifying a forecasted outside temperature for a day can be presented on a surface of a detector device.

In one instance, data from each of one or more detector devices is collected and processed according to one or more rules. An output of a rule can identify whether and/or which notification to present (e.g., on the detector device, on an access device and/or a device selected by a rule). An output of a rule can also or alternatively include one or more device-control parameters, which can include a device identifier, a binary or non-binary power setting, a time interval (e.g., for maintaining a power setting), and/or an intensity setting. The rule can be at least partly or completely: fixed, defined by a user and/or generated using a learning technique, e.g., by processing association of previously detected data with manual device operation controls. The rule can include and/or be based on one or more inferences. For example, one or more detections can support an inference that a user is not in a home or room, which can correspond with one or more actions to take.

In some instances, the processed detector-device data can include light data, such as whether a threshold light intensity was detected, a spatial and/or temporal differential in detected light intensity, a color of detected light, a spatial and/or temporal differential in detected light color, a pattern of detected light. In some instances, the rule is generated based on an indication as to where each of one or more detector devices are located and/or the rule can receive and process such information.

For example, a light detector can be positioned to monitor light data at a front or side of a house. A rule can indicate that a porch or driveway light is to be triggered when it detects a high-intensity light during an otherwise dark period. As another example, one or more characteristics associated with a flashlight illumination in darkness can be identified, and detection of such characteristic(s) can result in an access device to present a security warning or a security system to be activated. As another example, a rule can indicate that when a water detector (e.g., positioned at a location where water is not supposed to be) detects water, one or more electrical devices are to be powered off. As another example, a combination of light detectors (e.g., which can be combined into a single device or separately housed) can be used to detect a light pattern. A rule can associate particular pattern characteristics with particular persons (e.g., a pattern that includes light at a 3-foot level from the ground but not at a 5-foot level can be associated with a child).

In some instances, a computer-implemented method is provided. A stimulus variable can be identified at a detector device based on an environmental stimulus detected by a sensor. The detector device can include the sensor. The detector device can transmit an initial communication to a device. The first communication can include the stimulus variable. A new communication that includes data corresponding to another device can be received at the detector device. The detector device can determine, based on the stimulus detected by the sensor and is further based on the new communication, that a visual stimulus is to be presented. The visual stimulus can be presented.

In some embodiments, a detector device can be provided. The detector device can include a sensor for detecting an external stimulus and a light source. The detector device can also include one or more connection components configured to receive communications from and transmit communications to other devices and one or more processors coupled to the light source and the connection component. The detector device can further include a computer-readable storage medium containing instructions, that, when executed by the one or more processors, cause the one or more processors to perform actions. The actions can include identifying a stimulus variable based on an environmental stimulus detected by the sensor and transmitting, via the one or more connection components, an initial communication to a device. The first communication can include the stimulus variable. The actions can also include receiving, via the one or more connection components a new communication that includes data corresponding to another device. The actions can further include determining, based on the stimulus detected by the sensor and is further based on the new communication, that a visual stimulus is to be presented and presenting the visual stimulus.

In some embodiments, a computer-implemented method is provided. One or more environmental data points can be accessed. Each environmental data point in the one or more environmental data points can include one measured by a detector device and that characterizes a corresponding environmental stimulus. At least one of the environmental data points can be indicative of a light intensity or power usage measured by a first device. An inference can be generated based on the one or more environmental data points. A notification or device control can be identified based on the inference. A communication can be generated and transmitted to a second device. Receipt of the communication can cause the second device to present the notification or to be controlled in accordance with the device control.

In some embodiments, a system is provided that includes one or more data processors and a non-transitory computer readable storage medium containing instructions which when executed on the one or more data processors, cause the one or more data processors to perform actions in a process or method disclosed herein. In some embodiments, a computer-program product tangibly embodied in a non-transitory machine-readable storage medium is provides that includes instructions configured to cause one or more data processors to perform actions in a method or process disclosed herein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Illustrative embodiments of the present invention are described in detail below with reference to the following drawing figures.

DETAILED DESCRIPTION

Figure 1:
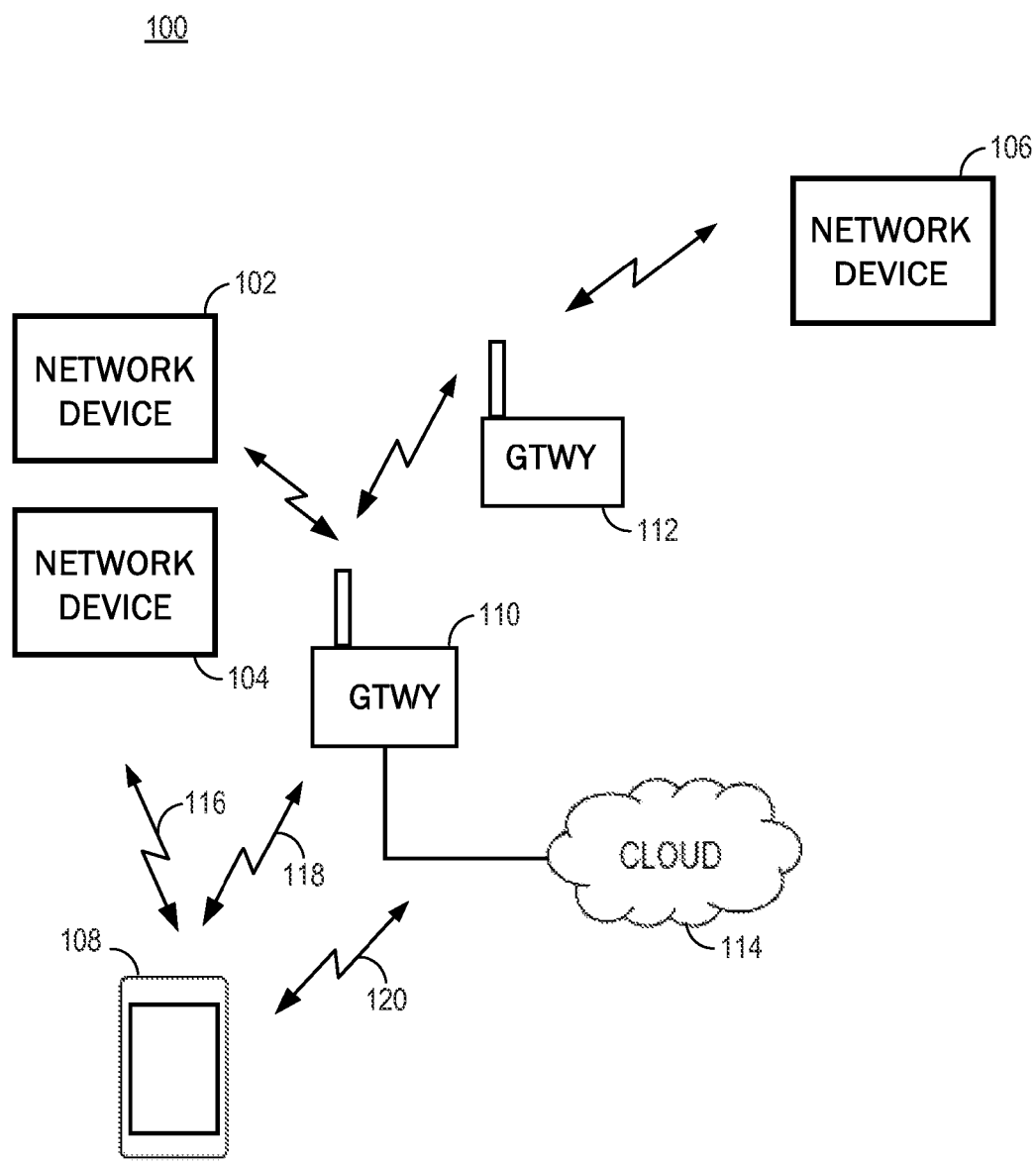
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

As explained herein, techniques are provided that allow for a detector network device to conditionally output notifications (e.g., via a same outer component used to received external stimuli for detection). Further, data from one or more detector network devices (e.g., data indicative of light presence, intensity, color or pattern) can be collected and analyzed to infer a context. A notification can then be presented (e.g., on a detector device or on an access device) and/or another device (e.g., another network device) can be controlled based on the inferred context. These techniques increase the utility of a detector device and improve automated environment-control and custom information available to a user.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

Accordingly, some techniques and systems are described herein for generating dynamic and/or custom notifications. The notifications can be presented on a detector surface, such that the surface becomes multi-purpose. For example, a white translucent lens on a device can serve to filter light (e.g., to filter out visible light and to let infrared light pass through the lens to activate a sensor, such as a PIR sensor). The lens can further emit or "glow" a diffused color (e.g., a blue color) to provide a notification of an event (e.g., to indicate that motion has been detected. Some techniques and systems are described herein for connecting a device to one or more other devices to support remote measuring, monitoring and/or device management. Thus, one or more devices can detect a presence, intensity, color and/or pattern of light. Such detection can, in some instances, support an inference (e.g., of a presence, arrival, absence, departure, path and/or device-control intention of one or more people generally or one or more specific people), and one or more same or different devices can be controlled based on the inference (e.g., to turn on lights, unlock a door, etc.).

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
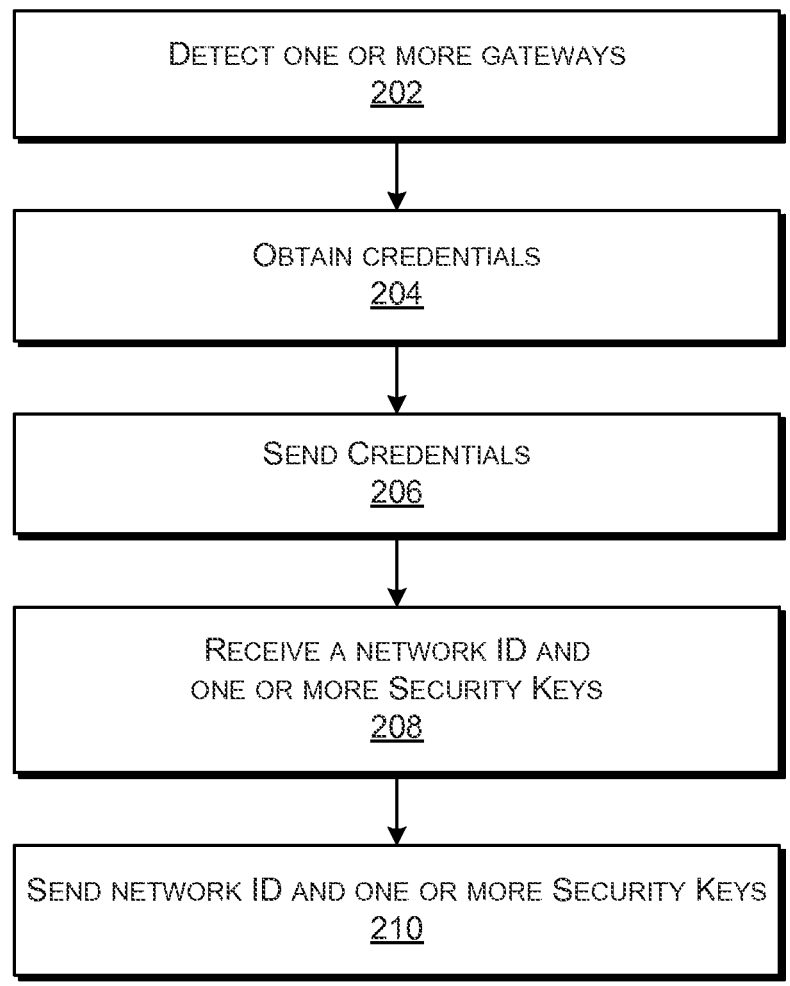
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the-network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each network device, or individual storage tables for each local area network or other subset of its network devices/networks. In one embodiment, a change in status may prompt the-network device to push its change in in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to-network devices 102 and 104 that they are each connected to the same local area network 100.

Figure 3:
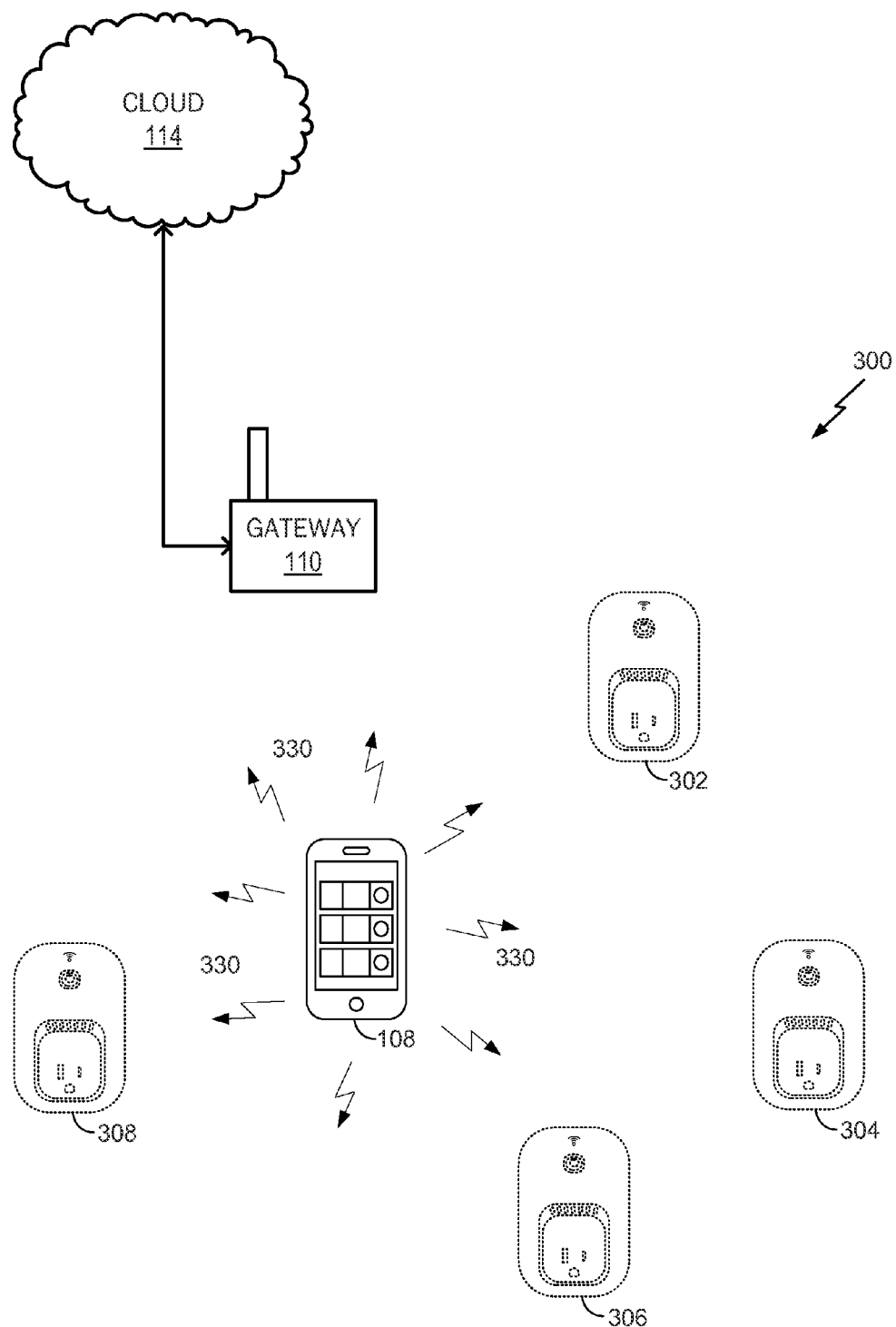
FIG. 3 is an illustration of an example of a network environment, in accordance with some embodiments.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
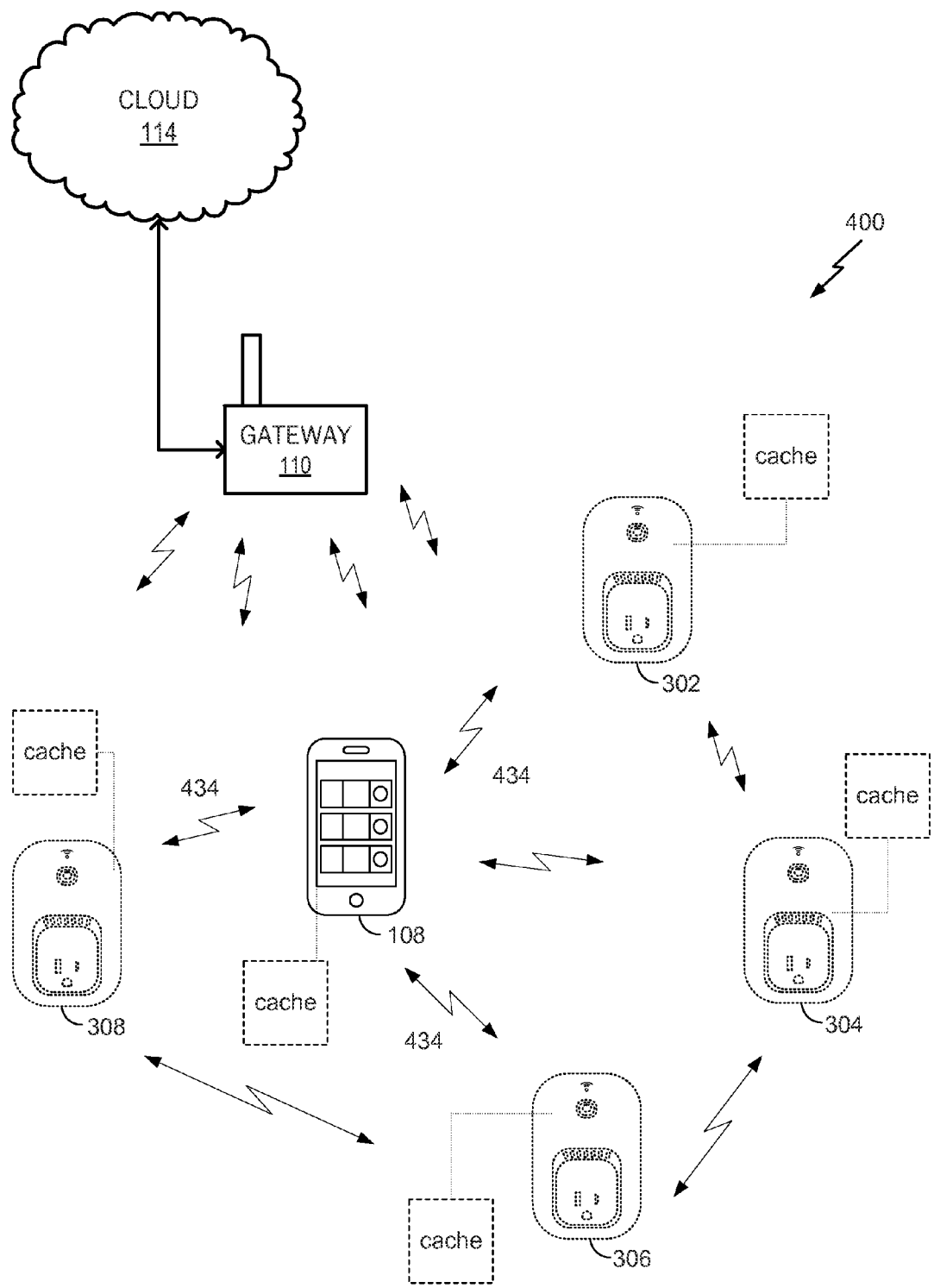
FIG. 4 is an illustration of an example of a network environment, in accordance with some embodiments.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/ powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/ updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
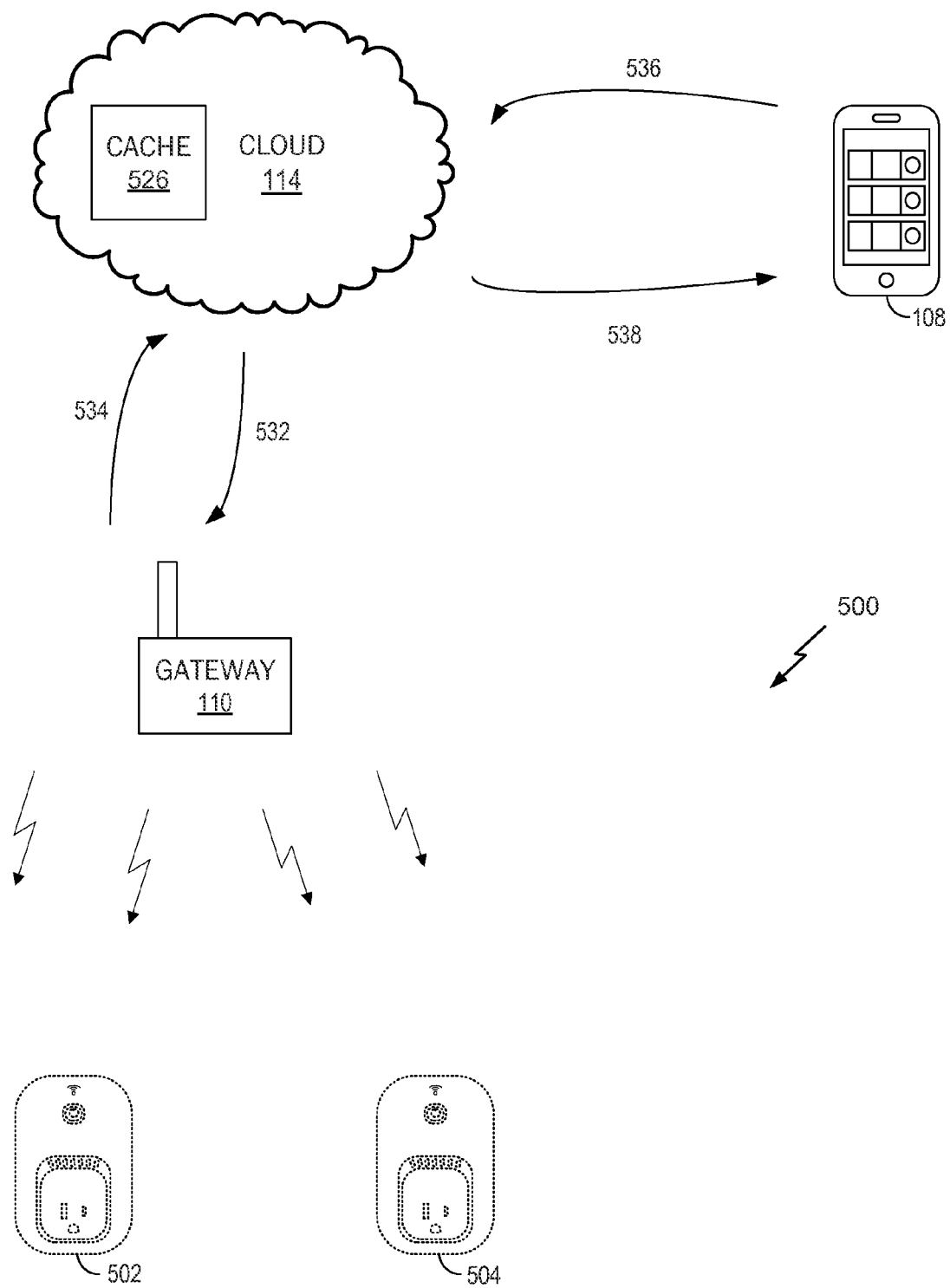
FIG. 5 is an illustration of an example of a network environment, in accordance with some embodiments.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Figure 6:
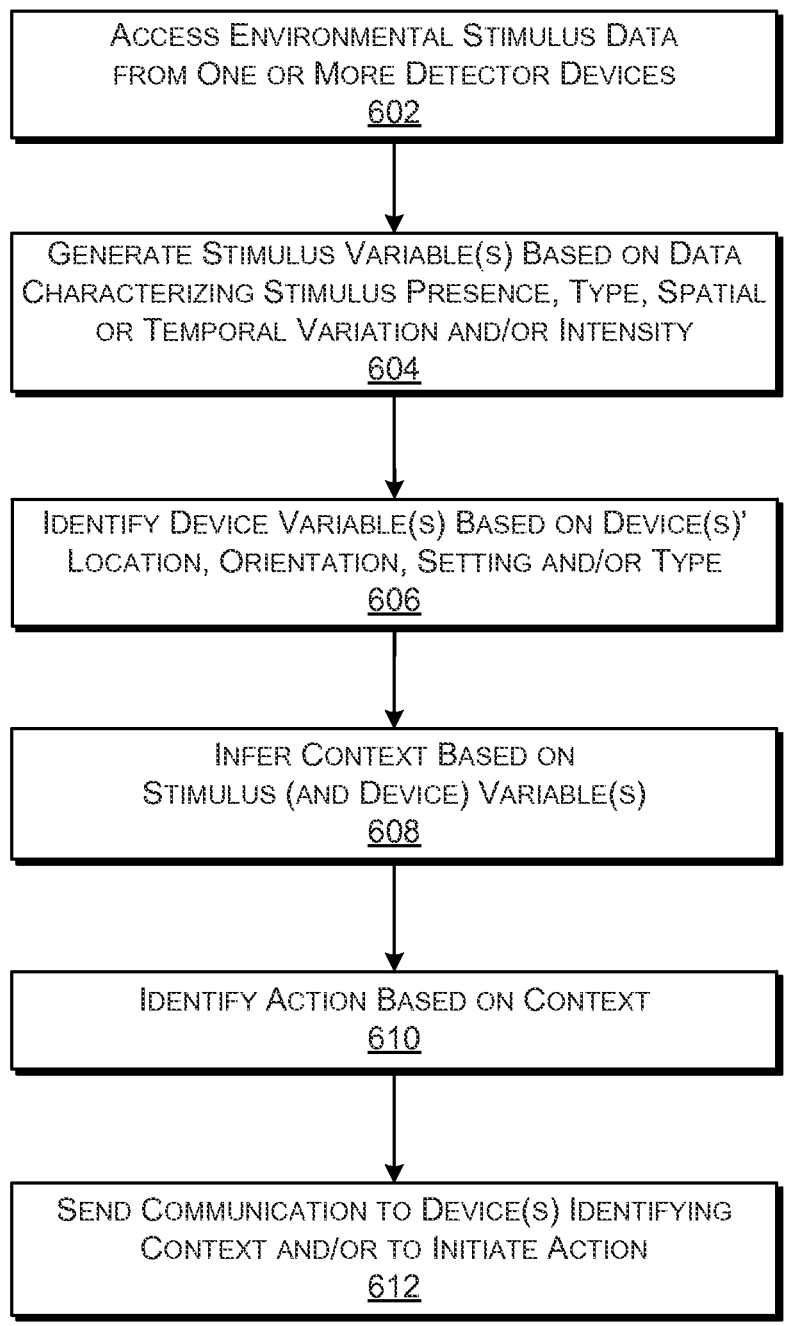
FIG. 6 illustrates an example of a process for using data from one or more detector devices to infer a context and control a device operation and/or notification presentation according to an embodiment of the invention.

FIG. 6 illustrates an example of a process 600 for using data from one or more detector devices to infer a context and control a device operation and/or notification presentation according to an embodiment of the invention. Part or all of process 600 can be performed, for example, by the cloud network 114, a gateway 110 or 112, or a network device 102, 104 or 106.

Process 600 can begin at block 602 where environmental stimulus data from one or more detector devices is accessed. Each of the one or more detector devices can be a network device, such as the network devices 102, 104, 106 illustrated in FIG. 1. In some instances, the one or more detector devices include different types of devices (e.g., configured to detect different types of stimuli) and/or devices positioned at different and/or corresponding locations (e.g., different rooms within a house or different locations within a room).

A detector of the one or more detector devices can be configured to detect data related to an environmental stimulus such as light, sound, acceleration, vibration, liquid (e.g., for leak detection, water usage or rain detection), humidity, temperature, pressure, air quality, seismic activity, smoke, carbon monoxide, etc. The detector of the one or more detector devices can be configured to detect a presence, intensity, pattern, type (e.g., light color), location and/or direction of the stimulus. The environmental stimulus can relate to a local environment around at least part of the detector, an inside environment (e.g., of a room or building), and/or an outside environment. In one instance, the environmental stimulus data is indicative of a presence, intensity, color, temporal pattern or spatial pattern of light detected by one or more light detectors. In some instances, at least one (or each) detector device can include an outer surface that serves as an interface to receive environmental stimuli. For example, the interface can include a lens (e.g., a Fresnel lens).

In some instances, a detector device is physically connected to another network device. The connection can be a permanent or interchangeable connection. For example, a detector device and another network device can each include a port configured to receive a connecting cable. In this manner, a given network device can be connected to any of a variety of devices. A physical connection can, in some instances, focus a detection to variables associated with the connected device (e.g., a power usage, a wireless connection strength, and/or a light emission of the device).

In some instances, the environmental stimulus data includes a plurality of data points. The plurality of data points can correspond to measurements from a single device made at a plurality of times and/or to measurements made from multiple devices (e.g., made at a single time, during a single time period or at different times). In instances where the data points are associated with multiple devices, the devices can be associated with a same gateway, network identifier, access device and/or user identifier. Two or more (or all) of the devices can be located within a same building or room. Two or more (or all) of the devices can, but need not, be of a same type. For example, one or more data points can be collected from each of a set of light detectors positioned at different locations within a home.

In some instances, at least one (or each) detector device is configured to perform and/or initiate an operation in addition to and/or independent of the detection. The operation can include a home-control operation, a power-control operation and/or an operation with an effect beyond data processing and/or presentation. For example, the operation can include controlling whether a light is on or off, operation of an HVAC system, a kitchen-appliance operation, operation of a security system, or operation of a laundry machine. In some instances, at least one (or each) detector device is a passive device that itself does not itself perform or initiate an operation (e.g., of one or more of the above-identified types).

At block 604, one or more stimulus variables are generated based on the data. In some instances, a stimulus variable includes stimulus data detected by a detector device. In some instances, a stimulus variable is a processed version of one or more detected stimulus data points. For example, a stimulus variable can include an average of a set of data points measured by a single detector, an average of a set of data points measured by different detectors, a latency between data points (or above-threshold measurements) measured by multiple detectors, a binary transformation of one or more data points, a spatial or temporal differential in measurements based by one or multiple detectors, etc.

In one instance, a stimulus variable is determined based on multiple environmental stimulus data from multiple detector devices. In one instance, a unique stimulus variable can be associated with each of a set of binary detector detections. For example, if a system included a light detector in three rooms, and each was associated with a threshold used to estimate whether a light was on, each of nine stimulus variables could represent a particular combination of the lights being on or off. In some instances, determining the stimulus variable can include determining one or more weights, such as a weight associated with each detector device (e.g., as determined using a learning technique. In some instances, the stimulus variable depends on an order of multiple detections. For example, a stimulus variable can depend on a sequence in which light was detected in multiple rooms.

At block 606, one or more device variables (e.g., each associated with a device that detected one or more environmental stimulus data points accessed at block 602) are identified. A device variable can relate, for example, to a device location (e.g., geographic coordinates or a room), orientation, setting, type, sensitivity, measurement scale, detection range, height, and/or movement. A device variable for a device can be based on, for example, stored data pertaining to the device, a signal from the device, a signal from another device, user input (e.g., identifying a functional location) or assessment of data points measured by the device.

At block 608, an inference is made based on the one or more stimulus variables. In some instances, the inference further depends on the identified one or more device variables. Generating an inference can include inferring a characteristic of a context, such as (for example) a characteristic of a context of a device (e.g., a device performing part or all of process 600 and/or a detector device of the one or more detector devices at block 602), person or user, home, and/or room. In some instances, generating an inference can include determining a context variable (e.g., such as an identifier) indicative of a context characteristic.

For example, a context variable can correspond to an inference as to whether anyone is in a home, who is in a home, who is about to enter a home, who is arriving at a home, whether a person is asleep, and/or an outside weather condition corresponding to a device location. In some instances, generating an inference includes a generating a prediction. For example, a prediction can be made as to which rooms in a house one or more people will occupy within 5 seconds, whether a user will be satisfied with (or would instead change) a device setting and/or a path that a user is embarking on.

The context can be inferred using, for example, a rule which can, for example, include one at least partly (or entirely) defined by a user and/or identified using a learning technique (e.g., using a decision-tree, association-rule, neural-network, inactive-logic-programming, support-vector-machine, clustering, Bayesian-networks, reinforcement-learning, representation-learning, similarity-learning, and/or sparse-dictionary-learning technique). The learning technique can include a dynamic or fixed technique and can be built on or updated using a data set associated with, for example, a group of users, group of device types, group of locations, a single user, a single device type, and/or a single location.

In one instance, one or more (e.g., a set of) of each of: stimulus, device, context and/or action variables can be analyzed to identify or modify properties of a learning technique (e.g., variable selection and/or weights). An analysis result can identify, for example, which stimulus and/or device variables are predictive of, correlated with or otherwise associated with one or more context and/or action variables and a relationship between such stimulus and/or device variables and the context and/or action variables. In one instance, a clustering technique is performed to identify clusters of stimulus and action variables. Each cluster can be approximated to be associated with a context.

A context variable (e.g., a cluster identifier) can be indicative of a context and, for example, identified based on input or other data (e.g., from a detector device). For example, detection of a local input from a home device can indicate that at least one person is at home, or detection of motion near a door can be indicative of a time of entry to a home or room.

An action variable can be indicative of a control of one or more devices (e.g., network devices) and/or a notification to be presented on a device. For example, an action variable can include a power state, level or intensity, setting, time control, and/or preset identifier (e.g., corresponding to a preset for a given user). In some instances, an action variable includes a change of a control of one or more devices (e.g., turning a device from off to on, setting a device timer, etc.). As another example, an action variable includes text and/or a graphic for a receiving device to present. Various action variables can correspond to context variables. For example, if a user locally changes a setting or power state for a device in a given room, such action can indicate that someone is present in the room.

In one instance, a context variable is distinct from an action variable. For example, a context variable can indicate that a user just arrived at home, and an action variable can indicate that a user de-activated a security system. In one instance, an action variable can serve as a context variable. In such instances, the inference made at block 608 can include predicting an action that a user will or would want to take. Thus, a rule can associate stimulus and/or device variables directly with desired actions rather than inferring why the reasons are appropriate.

At block 610, one or more actions (and/or one or more device identifiers) can be identified based on the context. The action can be determined using, for example, a look-up table or rule (e.g., defined by a user or determined using a learning technique, such as one disclosed herein). In one instance, a look-up table can associate each of one or more context variables with an action variable and/or a device identifier. For example, a context variable representing that one or more people are in a front yard after dark can correspond to a power-on action variable associated with a porch-light device identifier. As another example, a context variable associated with a user path from a bedroom to a front door can correspond to action and device variables associated with a time series of turning lights on and off. As yet another example, a context variable associated with a child napping can correspond to action and device variables associated with turning off or muting a doorbell, phone, laundry machine, sprinkler system, and HVAC.

At block 612, a communication can be sent to each of one or more devices, where the communication includes a context and/or action variable. When a context variable is included in the communication, in some instances, the receiving device can determine an action (if any) to perform based on the context variable. In some instances, the communication corresponds to an absolute or conditional instruction to perform an action (e.g., power on, power off, set a setting, set a sensitivity, present a notification) corresponding to the action variable. For example, in one instance, a communication can cause a device to present an indication of an action and to perform the action if contrary user input is not received within a defined time period. As another example, a communication can cause a device to perform an action so long as the device has not inferred a context contrary to a context variable included in the communication.

It will be appreciated that (as is true for all processes disclosed herein), in some instances, process 600 can be modified to omit one or more depicted blocks. For example, process 600 can be performed at a network device, and the action identified at block 610 can correspond to one to be performed by the network device. In some instances, block 612 may then be omitted, though in other instances, block 612 can be modified to transmit a notification of a context or action variable (e.g., such that it can be used for inter-device coordination or rule modification).

Through process 600, devices can coordinate their detections and operations. Because devices can (for example) be positioned at different locations, have different detection capabilities, have different user popularities, etc., using data from a first device to influence an operation of a second device can improve a success (e.g., in terms of user satisfaction) of such automated operation. Further, in some instances, a rule can directly relate environmental stimulus data to action variables. However, introducing an intermediate non-action context variable in the relationship can further improve a rule adaptability and a user's satisfaction with the rule. For example, a context-based rule can identify three different stimulus variables indicating that a particular user is home and five different actions that are to be performed when it is inferred that the user is home. If later a new stimulus variable is determined to be indicative of a user being home, a learning technique need not separately learn that the new variable is associated with each of the five actions; rather, the single association with the home context can automatically associate the new stimulus variable with each of the actions.

Figure 7:
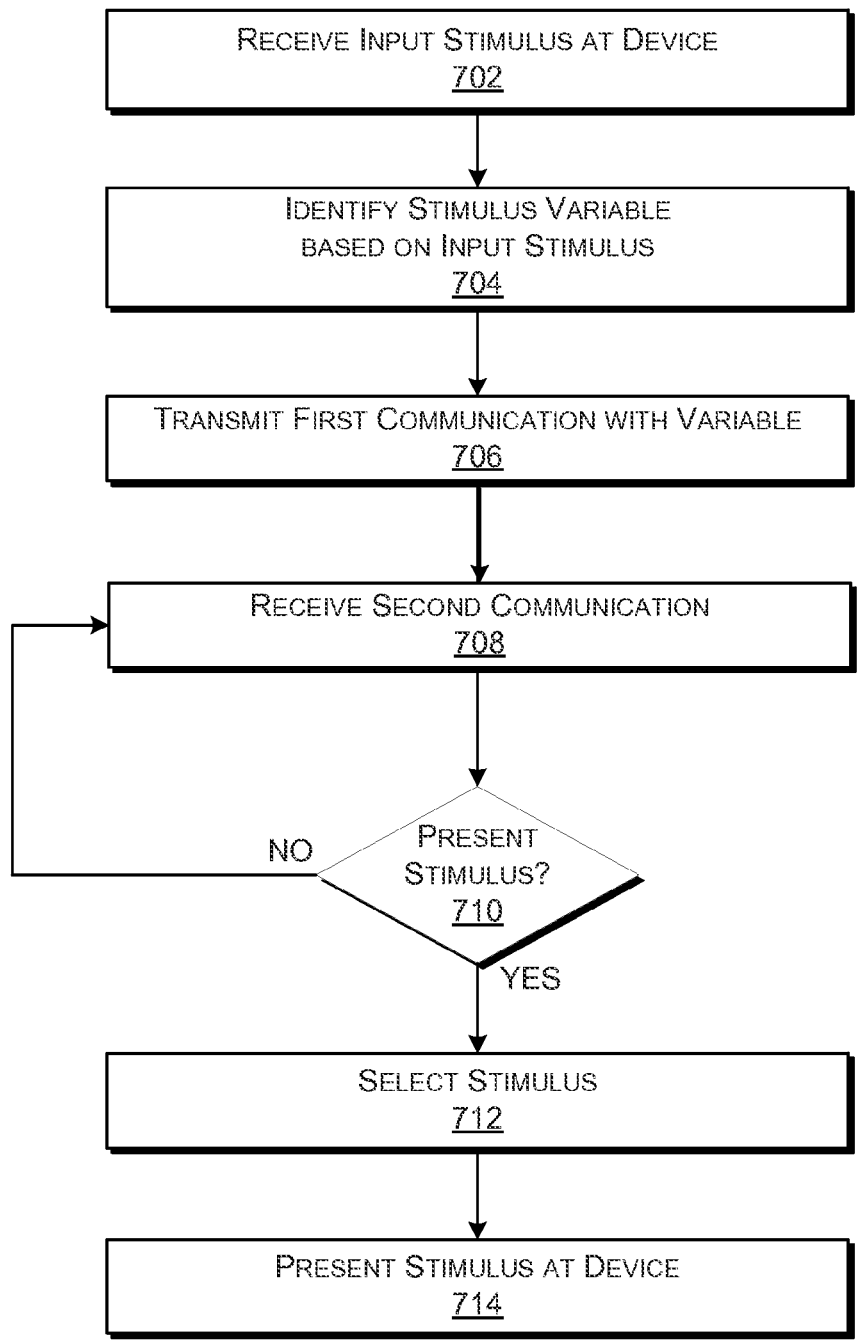
FIG. 7 illustrates an example of a process for presenting a stimulus at a detector device according to an embodiment of the invention.

FIG. 7 illustrates an example of a process 700 for presenting a stimulus at a detector device according to an embodiment of the invention. Part or all of process 700 can be performed, for example, by a detector device, which can also be network device 102, 104 or 106. In some instances, a detector device (as referred to herein) can include one lacking a user interface, one or more buttons, a touchscreen, an input-component port, etc.

Process 700 can begin at block 702 where the device can receive input stimulus data. The input stimulus data can include data reflecting an environment. For example, a detector device can be configured to receive, process and/or detect light, sound, acceleration, vibration, liquid (e.g., for leak detection, water usage or rain detection), humidity, temperature, pressure, air quality, seismic activity, smoke, or carbon monoxide data. The stimulus can be received at an interface of the device, which can include, for example, a lens or membrane. In one instance, a device receives multiple input stimuli. For example, a device can be configured to detect light intensity corresponding to different spatial locations.

In one instance, the detector device can be configured to receive a light stimulus and/or to detect a presence, intensity, pattern, type (e.g., light color), location and/or direction of the stimulus. The device can include, for example, a photodiode, photoresistor, active-pixel sensor, and/or reverse-biased LED.

At block 704, a stimulus variable can be identified based on the input stimulus. The stimulus variable can include a property of the detected stimulus, such as a presence, intensity, direction, time, spatial pattern and/or temporal pattern of the stimulus. The variable can be determined by thresholding received data (using hardware or software) to estimate whether a stimulus was present. The threshold can be fixed, determined based on user input or determined based on other detector data points (e.g., associated with a corresponding time or time period, such as to be able to implement a relative spatial or temporal detection). In one instance, a stimulus variable reflects a digital output, resistance or current corresponding to a detected light intensity. Determining a stimulus variable can include processing raw data (e.g., using hardware or software) to, for example, filter the data over time or identify an average or extremum of a collection of data points.

At block 706, a first communication that includes the stimulus variable can be transmitted by the detector device.

The first communication can be transmitted to, for example, another network device, a gateway or a server on a cloud network. The first communication can also include, for example, an identifier of the device, a network identifier, a gateway identifier, and/or a time (e.g., at which the stimulus was received, the stimulus variable was identified or the first communication was transmitted). In some instances, the transmission includes a conditioned transmission. For example, the transmission can occur only when the stimulus variable exceeds a particular threshold, when a change in the stimulus variable exceeds a particular threshold, when a defined time period has passed since a previous transmission, when the device received a request for the stimulus variable, etc.

At block 708, the detector device can receive a second communication. The second communication can be from a same device as to which the first communication was transmitted or a different device. The second communication can be received from, for example, another network device, a gateway or a server on a cloud network. The second communication can include also include an identifier of the device, a network identifier, a gateway identifier, and/or a time.

The second communication can include raw or processed data detected at one or more detector devices (e.g., of same or different types and/or corresponding to a same or different gateway, room, location, building, network identifier, and/or user account). For example, the second communication can include one or more stimulus variables or processed versions thereof.

The one or more detector devices may, or may not, include the device receiving the communication.

The data can relate to a presence, intensity, direction, time, spatial pattern and/or temporal pattern of one or more detected stimuli. In one instance, the data includes processing aggregated stimulus variables (e.g., aggregated across device) to, e.g., obtain a statistic (e.g., a minimum, maximum, mean, mode, variation, count, percentage (e.g., of above-threshold variables) or median), filter the data or categorize the data. For example, a time series of power detections can be obtained from each of a set of devices. The time series can be summed across devices and filtered in time. A maximum can then be identified from the processed time series and included in the second communication.

As another example, the second communication can indicate that a cumulative power usage as detected by devices in one room or a house, a light intensity detected by a detector in another room (e.g., a child's bedroom) has substantially decreased, or a temperature detected inside a house is warmer than an outside temperature associated with a location of the house etc.). As another example, the second communication can include data reflecting user input or device operation at another network device (e.g., a power status, a setting or an estimated task-completion time), and/or data pertaining to a user account (e.g., identifying a calendar event, a new email, a new text message or a new voice message).

In some instances, the second communication includes an implicit or explicit instruction. The instruction can include presenting a general stimulus (e.g., by powering a single light source at the device) or presenting a specific stimulus (e.g., by powering one or more select light sources, applying select spectral or spatial filters, selecting a stimulus from amongst a set of stimuli, presenting text included in or generated based on the second communication, etc.).

At block 710, a determination can be made based on the second communication as to whether to present a stimulus. In one instance, receipt of the second communication is indicative that a stimulus is to be presented. In one instance, data in the second communication can be analyzed to determine whether a stimulus is to be presented. For example, the determination can be based on a detected value (e.g., whether a detected value exceeds a threshold) and/or a device identifier included in the second communication (e.g., whether it matches one in a presentation look-up table).

In one instance, the determination is based at least in part on a detection, context or characteristic of the detector device. For example, a presentation condition can include that the stimulus variable identified at block 704 exceed a threshold. Such a condition can result in a reservation of stimulus presentation for times when it can be inferred or is likely that someone is near (e.g., is in a same room or building or is across from) the detector device, such that presentations not likely to be seen by anyone can be avoided (e.g., to thereby reduce energy consumption, light resources, etc.).

As another example, in some instances, data included in the second communication is based on the identified stimulus variable (e.g., if the second communication includes a statistic representative of the variable and other stimulus variables). Thus, a presentation determination can depend on the identified stimulus variable by virtue of being based on the data included in the second communication.

As yet another example, if the detector device is presenting another stimulus, it can postpone or reject postponing another stimulus particularly associated with the second communication. As another example, the detector device can present the stimulus only if light or motion is detected by the detector device, if a charge of the detector device is above a threshold and/or if a power supply is of a particular type. In some instances, determining whether to present the stimulus includes inferring a context (e.g., a user or house), such as inferring how many (and/or which) users are in a home, whether and/or when a user is predicted to arrive at a home or in a room, etc.

When it is determined that a stimulus is not to be presented, process 700 can return to block 708 (and/or to block 702). When it is determined that a stimulus is to be presented, process 700 can continue to block 712 where a stimulus can be selected. In some instances, a detector device is configured to present only a single stimulus, and thus, the stimulus selected at block 712 can correspond to the single stimulus. In some instances, a detector device can be configured to present any of multiple stimuli. Selecting a stimulus can then include, for example, selecting a color, spatial pattern, temporal pattern, duration and/or intensity for a stimulus (e.g., a visual stimulus) and/or selecting text and/or an image to include in the stimulus. In some instances, the selection includes selecting between a set of stimuli.

The selection can be based on, for example, data included in the second communication (e.g., which can include a raw or processed stimulus variable from one or more detector devices), an identifier in the second communication, a detection, context or characteristic of the detector device, and/or a stimulus-selection rule (e.g., as defined based on, for example, user data or a learning technique). For example, a color of a light stimulus can be indicative of which device type sent the second communication. As another example, a stimulus can be indicative of an inferred arrival or departure of a user in a house; a first stimulus characteristic (e.g., a color) can correspond to an estimated identity of the user, and a second stimulus characteristic (e.g., a temporal flashing pattern) can correspond to whether it is estimated that the user is arriving or leaving. As yet another example, an intensity of a first region of a stimulus can correspond to a power usage detected at the detector device and an intensity of a second region (e.g., next to, inside or around the first region) of the stimulus can correspond to a power usage accumulated across devices in a given room or house.

In some instances, the stimulus can be of a same modality of the input stimulus. For example, a detector device can be configured to detect visual stimuli (e.g., by detecting light intensity) and also to present visual stimuli. In some instances, the stimulus includes a different modality relative to the input stimulus (e.g., the stimulus being an audio stimulus).

At block 714, the selected stimulus can be presented. In some instances, the stimulus is presented using at least part of a same interface as used to receive the input stimulus at block 702. For example, a lens can be used both to receive light and to present a visual stimulus. In some instances, the stimulus is presented using at least partly a different interface as compared to that used to receive the input stimulus. For example, a lens on a detector device can be used to receive light and a visual stimulus can be presented at or through a different surface on the device.

Thus, process 700 illustrates how a device can both serve to detect local stimuli and also to receive data from other devices (e.g., connected to a same gateway) to present stimuli serving as notifications of events or inferences. Such a passive notification can be used to convey operation of household devices, detections pertaining to household members or the house and/or alerts in a non-intrusive manner using an interface already present in a setting.

It will be appreciated that (as is the case for all processes disclosed herein), the order of the blocks is illustrative and be modified. For example, blocks 702-706 can be performed after blocks 708-714 or 708-710. Further, it will be appreciated that blocks in process 700 can be performed a different number of times. For example, blocks 702-706 can be performed multiple times relative to a number of times blocks 708-714 are performed.

In one particular implementation, process 700 can be performed by a motion or light detector. Thus, the input stimulus received at block 702 can include light input, and the stimulus can be received via a lens (e.g., a Fresnel lens). Further, the stimulus variable identified at block 704 can be detected used a PIR (passive infrared) sensor and can include one or more light-intensity measures. At block 714, presenting the stimulus can include emitting a light at a light source in the device, filtering the light and/or projecting the light. In some instances, the device can be configured to include multiple pixels. To present a stimulus, one or more intensities (e.g., RGB intensities) can be assigned to each pixel.

Figure 8:
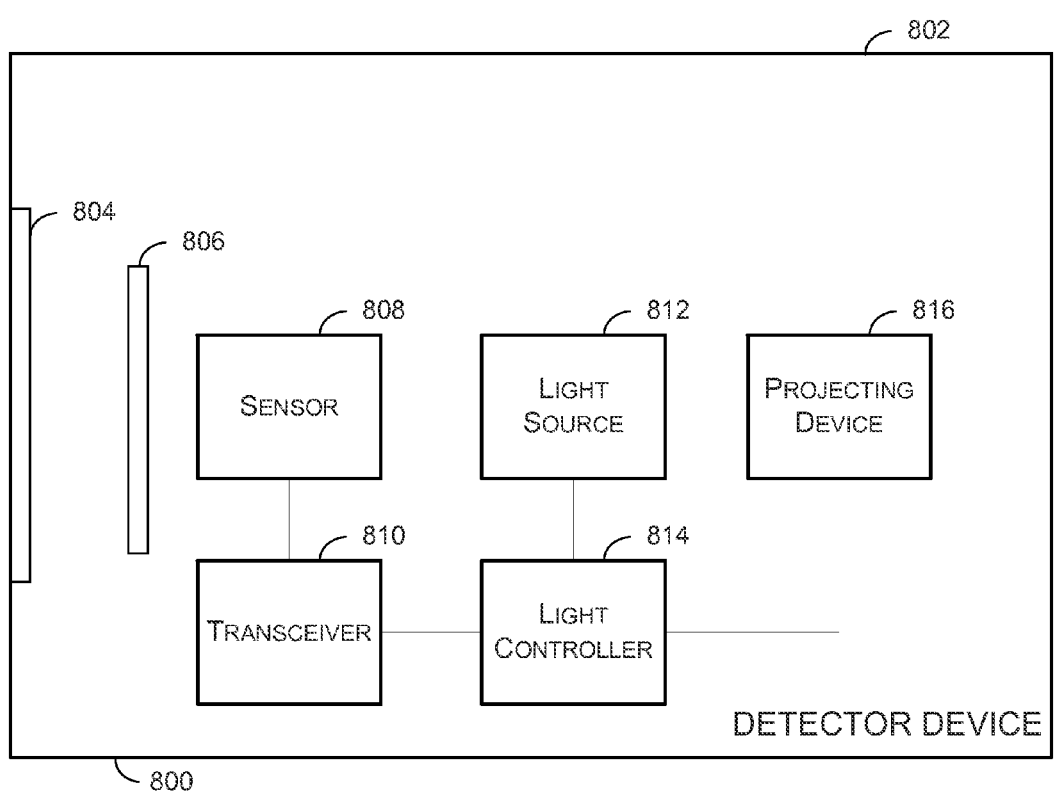
FIG. 8 is an example of a block diagram of a detector device depicting different hardware and/or software components of the detector device according to an embodiment of the invention.

FIG. 8 is an example of a block diagram of a detector device 800 depicting different hardware and/or software components of the detector device 800. Detector device can include a housing 802 surrounding part, most or all of the device. A material of the housing can include, for example, a plastic or metal. The material can be opaque or translucent. In some instances, a part of a housing includes a lens 804 or other focusing device. An absorption, reflectivity, transmissivity, refractive index and/or material of lens 804 can differ from and/or be greater than another portion of housing 802.

Device 800 can include a filter 806 positioned behind the lens. The filter can include a filtered to filter out infrared light, visible light or light associated with particular wavelengths (e.g., associated with particular colors). A sensor 808 can be positioned to receive filtered light. The sensor can be configured to detect visible or infrared light. For example, sensor 808 can include a PIR sensor or a photodetector or photodiode. A raw or processed output of sensor 808 can be included in a signal, which a transmitter of device 810 (not shown) can transmit to another device.

Device 800 can also include a light source 812. Light source 812 includes a backlight or frontlight. In some instances, device 800 further includes a light controller 814 (e.g., one or more light valves, power regulators, and/or filters) to specify light properties, such as whether light is emitted, a light wavelength, a light intensity, a temporal light pattern or duration, and/or a spatial light pattern or size. Device 800 can, in some instances, include a projecting device 816 to project the light towards lens 804. Thus, device 800 can be configured to detect a visual stimulus and to present a visual stimulus.

As discussed herein, whether and/or which visual stimulus can depend on data received at one or more other network devices. The visual stimulus can depend on a device detection and/or a context inference.

It will be appreciated that detector device 800 can also include additional components not shown in FIG. 8 and/or different operation capabilities or properties beyond or instead of those described with respect to the figure. For example, detector device 800 can include a processor, DSP and/or memory and/or a component as shown in any of FIGS. 9-13 or discussed in relation to any such figure. In some instances, detector device 800 lacks a user interface.

Figure 9:
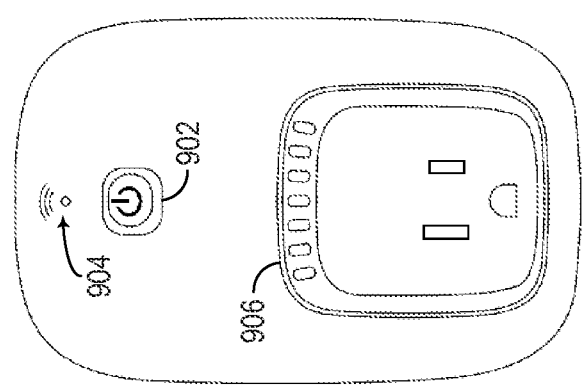
FIG. 9 is an illustration of an example of a front view of a network device, in accordance with an embodiment.
Figure 10:
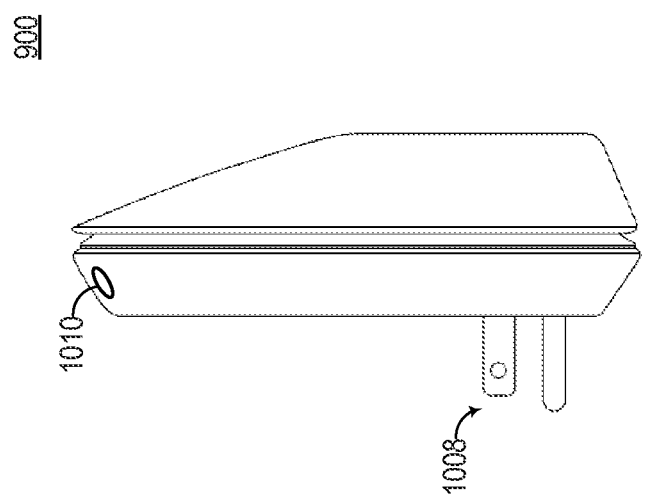
FIG. 10 is an illustration of an example of a side view of a network device, in accordance with an embodiment.

FIG. 9 illustrates an example of a front view of a network device 900. FIG. 10 illustrates an example of a side view of the network device 900. The network device 900 may include any of the network devices 102, 104, or 106 described herein. In some embodiments, the network device 900 may be a home automation network device. For example, the network device 900 may include a home automation switch that may be coupled with a home appliance. A user may wirelessly access the network device 900 in order to access, control, and/or configure various home appliances located within the user's home. For instance, the user may remotely control appliances such as a television, radio, light, microwave, iron, space heater, wall A/C unit, washer, dryer, fan, and/or the like. Network device 900 can include one configured to communicate directly or indirectly (e.g., via a gateway or cloud network) with a detector device. Additionally or alternatively, a detection or operation of network device 900 can, in part or in full, support a context inference and/or a determination that a detector device is to present a stimulus (e.g., corresponding to a notification, such as a notification of a power usage).

In some embodiments, the network device 900 may include a WiFi enabled switch that connects home appliances and other electronic devices to a compatible 802.11b/g/n/ac WiFi network. The network device 900 may thus allow users to locally or remotely turn devices on or off from anywhere, program customized notifications, and/or change device status. The network device 900 may further allow a user to create custom schedules or have devices respond to sunrise or sunset.

The network device 900 includes an power switch 902 that may be depressed in order to turn the network device 900 on and off. In some embodiments, a light source may be integrated with or located behind the power switch. For example, a light-emitting diode (LED) may be located on a circuit board under the power button 902. The light source may be illuminated when the network device 900 is powered on, and may not be illuminated when the network device 900 is powered off.

The network device 900 further includes a communications signal indicator 904. The signal indicator 904 may indicate whether the network device 900 has access to a communications signal, such as a WiFi signal. For example, the signal indicator 904 may include a light source (e.g., a LED) that illuminates when the network device 900 is connected to a communications signal. The light source may depict different colors or other characteristics (e.g., flashing, dimming, or the like) to indicate different levels of signal strength or mode of operation.

The network device 900 includes a restore button 1010. The restore button 1010 may allow a user to reset the network device 900 to factory default settings. For example, upon being depressed, the restore button 1010 may cause all software on the device to be reset to the settings that the network device 900 included when purchased from the manufacturer.

The network device 900 further includes a plug 1008 and an outlet 906. The plug 1008 allows the network device 900 to be plugged into a wall socket, such as a socket providing 120V, 220V, or the like. In turn, an appliance may be plugged into the outlet 906. Once the network device 900 is registered according to the techniques described above, an appliance plugged into the socket 906 may be controlled by a user using an access device (e.g., access device 108).

Figure 11:
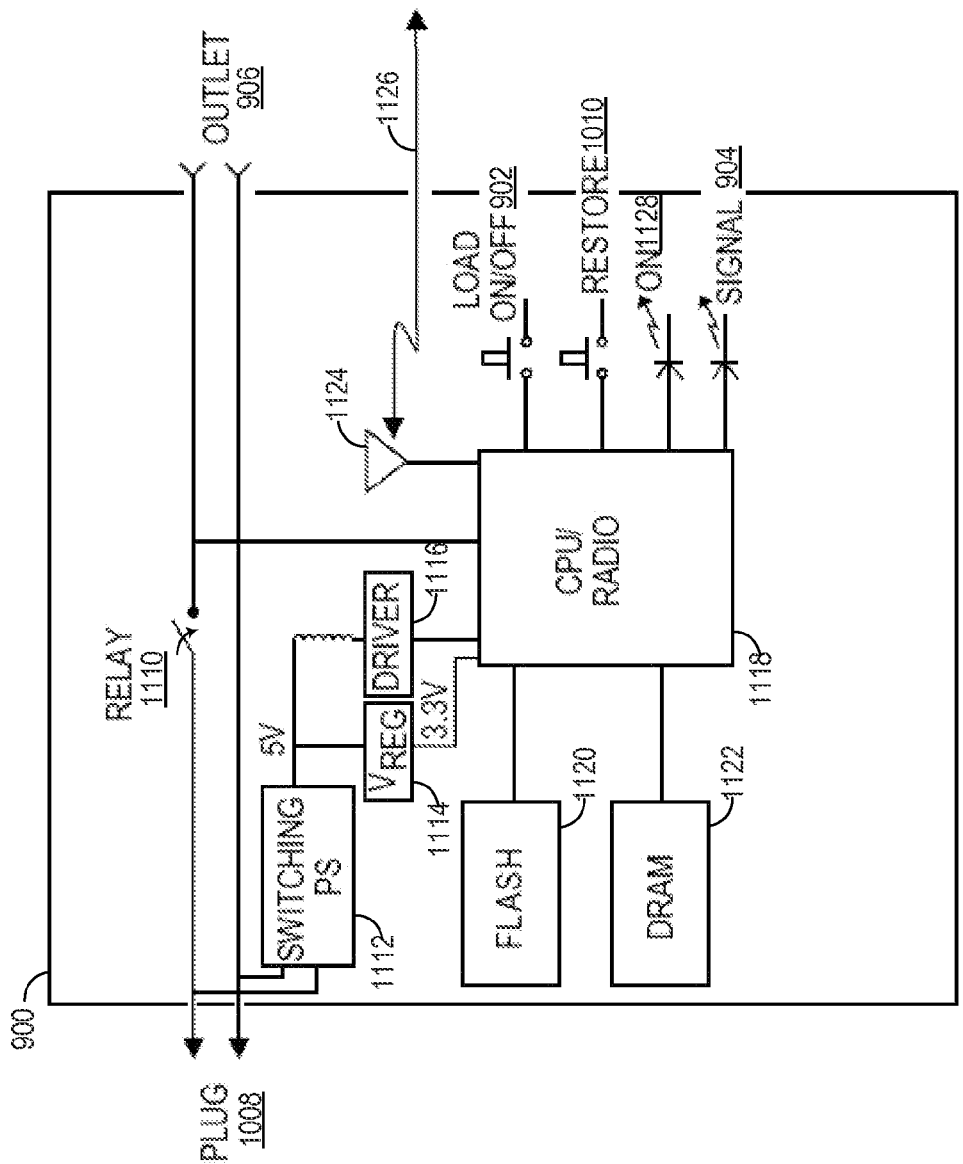
FIG. 11 is an example of a block diagram of a network device, in accordance with an embodiment.

FIG. 11 is an example of a block diagram of the network device 900 depicting different hardware and/or software components of the network device 900. As described above with respect to FIGS. 9 and 10, the network device 900 includes the outlet 906, the plug 1008, the power button 902, the restore button 1010, and the communications signal indicator 904. The network device 900 also includes light source 1128 associated with the power button 902. As previously described, the light source 1128 may be illuminated when the network device 900 is powered on.

The network device 900 further includes a relay 1110. The relay 1110 is a switch that controls whether power is relayed from the plug 1008 to the outlet 906. The relay 1110 may be controlled either manually using the power button 902 or remotely using wireless communication signals. For example, when the power button 902 is in an ON position, the relay 1110 may be closed so that power is relayed from the plug 1008 to the outlet 906. When the power button 902 is in an OFF position, the relay 1110 may be opened so that current is unable to flow from the plug 1008 to the outlet 906. As another example, an application or program running on an access device may transmit a signal that causes the relay 1110 to be opened or closed. For instance, an access application may display a graphical interface on the access device that includes a power button. The user may tap or otherwise select the power button, and the access application may send a communication signal (e.g., over a WiFi network) to the network device 900 instructing the network device 900 to open or close the relay 1110.

The network device 900 further includes flash memory 1120 and dynamic random access memory (DRAM) 1122. The flash memory 1120 may be used to store instructions or code relating to an operating system, one or more applications, and any firmware. The flash memory 1120 may include nonvolatile memory so that any firmware or other program can be can updated. In the event the network device 900 loses power, information stored in the flash memory 1120 may be retained. The DRAM 1122 may store various other types of information needed to run the network device 900, such as all runtime instructions or code.

The network device 900 further includes a CPU/Radio 1118. The CPU/Radio 1118 controls the operations of the network device 900. For example, the CPU/Radio 1118 may execute various applications or programs stored in the flash memory 1120 and/or the dynamic random access memory (DRAM) 1122. The CPU/Radio 1118 may also receive input from the various hardware and software components, interpret the input, and perform one or more functions in response to the input. As one example, the CPU/Radio 1118 may determine whether the power button 902 has been pressed, and determines whether the relay 1110 needs to be opened or closed. The CPU/Radio 1118 may further perform all communications functions in order to allow the network device 900 to communicate with other network devices, one or more gateways, a cloud network, and/or one or more access devices. While the CPU and radio of the network device 900 are shown to be combined in the CPU/Radio 1118, one of ordinary skill in the art will appreciate that, in some embodiments, the CPU and radio may be separately located within the network device 900. For example, CPU circuitry may be situated at a separate location on a circuit board from the location of radio circuitry, the CPU circuitry may be located on a different circuit board from the radio circuitry, or the like. Further, the network device 900 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 900 does not include a cellular network transceiver radio or interface, and thus may not be configured to directly communicate with a cellular network. In some embodiments, the network device 900 may include a cellular network transceiver radio, and may be configured to communicate with a cellular network using the cellular network transceiver radio.

The network device 900 may communicate with other devices and/or networks via antenna 1124. For example, antenna 1124 may include a 2.4 GHz antenna, a 5 GHz antenna, or the like, that can transmit and receive WiFi communications signals. The network device 900 may include other types of antennas that can communicate Bluetooth® signals, Zigbee® signals, Ultra-Wideband (UWB) signals, WiFi-Direct signals, BLE signals, and/or the like. In some embodiments, the antenna 1124 may be configured to communicate different types of signals, such as the WiFi signals, Bluetooth® signals, Zigbee® signals, UWB signals, WiFi-Direct signals, BLE signals, and/or the like. In some embodiments, the network device 900 may include multiple antennas for communicating the different types of communication signals. As one example, the network device 900 may include both a 2.4 GHz antenna and a 5 GHz antenna.

The network device 900 further includes a driver 1116, a switching power supply 1112, and a voltage regulator 1114. The driver 1116 may include instructions or code that can be used to translate control signals or commands received from applications running on the DRAM 1122 to commands that the various hardware components in the network device 900 can understand. In some embodiments, the driver 1116 may include an ambient application running on the DRAM 1122. The switching power supply 1112 may be used to transfer power from the outlet in which the plug 1008 is connected to the various loads of the network device 900 (e.g., CPU/

Radio 1118). The switching power supply 1112 may efficiently convert the voltage and current characteristics of the electrical power to a level that is appropriate for the components of the network device 900. For example, the switching power supply 1112 may perform AC-DC conversion. In some embodiments, the switching power supply 1112 may be used to control the power that is relayed from the plug 1008 to the outlet 906. The voltage regulator 1114 may be used to convert the voltage output from the switching power supply 1112 to a lower voltage usable by the CPU/Radio 1118. For example, the voltage regulator 1114 may regulate the DC voltage from 5V to 3.3V.

In various embodiments, functions may be stored as one or more computer-program products, such as instructions or code, in a non-transitory machine-readable storage medium, such as the flash memory 1120 and/or the DRAM 1122. The network device 900 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 1120 and/or the DRAM 1122, may be a processor-readable memory and/or a computer-readable memory that stores software code (programming code, instructions, etc.) configured to cause a processor(s) within the CPU/Radio 1118 to perform the functions described. In other embodiments, one or more of the functions described may be performed in hardware.

A set of these instructions and/or code might be stored on a non-transitory machine-readable storage medium, such as the flash memory 1120 and/or the DRAM 1122. In some cases, the storage medium might be incorporated within a computer system, such as the CPU/Radio 1118. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 900 and/or might take the form of source and/or installable code, which, upon compilation and/or installation on the network device 900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 900 may have other components than those depicted in FIGS. 9-11. Further, the embodiment shown in the figures are only one example of a network device that may incorporate an embodiment of the invention. In some other embodiments, network device 900 may have more or fewer components than shown in the figure, may combine two or more components, or may have a different configuration or arrangement of components.

Figure 12:
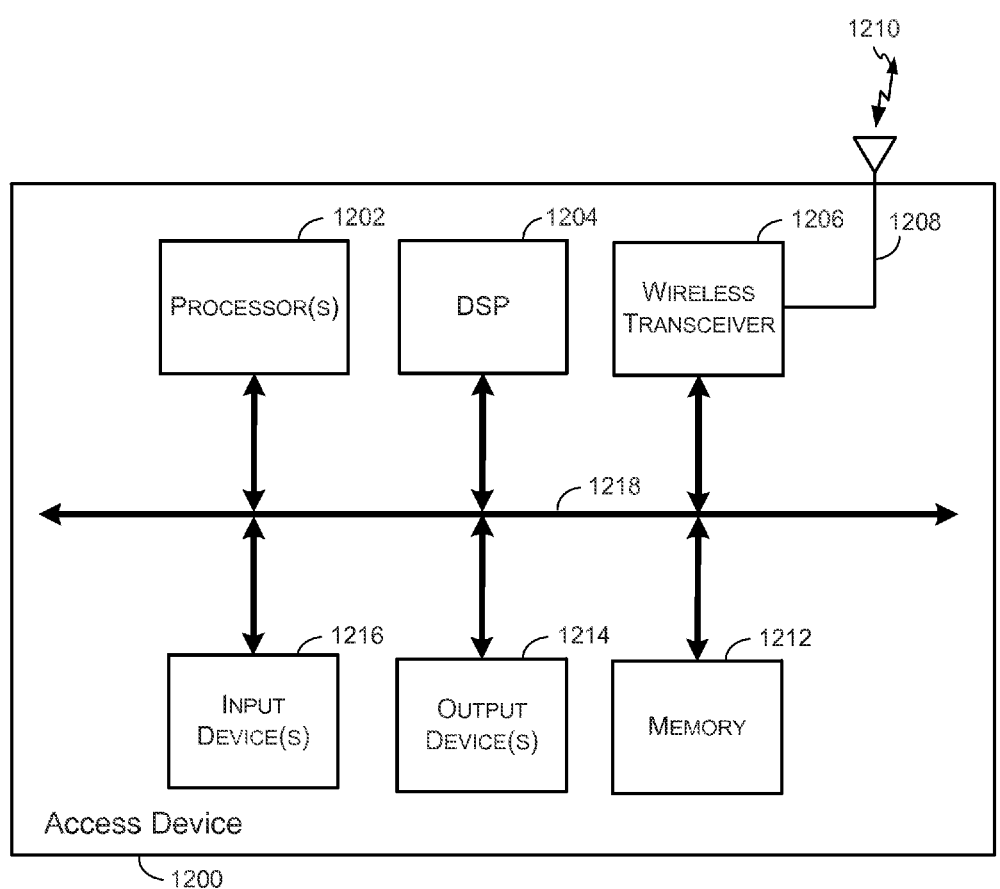
FIG. 12 is a block diagram illustrating an example of an access device, in accordance with some embodiments.

FIG. 12 illustrates an example of an access device 1200. The access device 1200 may include any human-to-machine interface with network connection capability that allows access to a network. For example, the access device 1200 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1200 includes hardware elements that can be electrically coupled via a bus 1218 (or may otherwise be in communication, as appropriate). In one embodiment, the bus 1218 can be used for the processor(s) 1202 to communicate between cores and/or with the memory 1212. The hardware elements may include one or more processors 1202, including without limitation one or more general-purpose processors and/or one or more special-purpose processors (such as digital signal processing chips, graphics acceleration processors, and/or the like); one or more input devices 1216, which can include without limitation a camera, a mouse, a keyboard, a touch sensitive screen, a touch pad, a keypad, and/or the like; and one or more output devices 1214, which can include, without limitation, a display, a printer, and/or the like.

The access device 1200 may include one or more wireless transceivers 1206 connected to the bus 1218. The wireless transceiver 1206 may be operable to receive wireless signals (e.g., signal 1210) via antenna 1208. The wireless signal 1210 may be transmitted via a wireless network. In some embodiments, the wireless network may be any wireless network such as a wireless local area network (e.g., local area network 100), such as WiFi, a Personal Access Network (PAN), such as Bluetooth®, Zigbee®, or UWB, or a cellular network (e.g. a GSM, WCDMA, LTE, CDMA2000 network). Wireless transceiver 1206 may be configured to receive various radio frequency (RF) signals (e.g., signal 1210) via antenna 1208 from one or more gateways, network devices, other access devices, cloud networks, and/or the like. Access device 1200 may also be configured to decode and/or decrypt, via the DSP 1204 and/or processor(s) 1202, various signals received from one or more gateways, network devices, other access devices, cloud networks, and/or the like.

The access device 1200 may further include (and/or be in communication with) one or more non-transitory machine-readable storage mediums or storage devices (e.g., memory 1212), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1212, such as RAM, ROM, FLASH, or disc drive, and executed by processor(s) 1202 or DSP 1204. The access device 1200 can also comprise software elements (e.g., located within the memory 1212), including, for example, an operating system, device drivers, executable libraries, and/or other code, such as one or more application programs, which may comprise computer programs implementing various functions. Memory 1212 may be a non-transitory machine-readable storage medium, processor-readable memory, and/or a computer-readable memory that stores the one or more computer-program products configured to cause the processor(s) 1202 and/or DSP 1204 to perform the various functions. In other embodiments, the various functions described may be performed in hardware.

Figure 13:
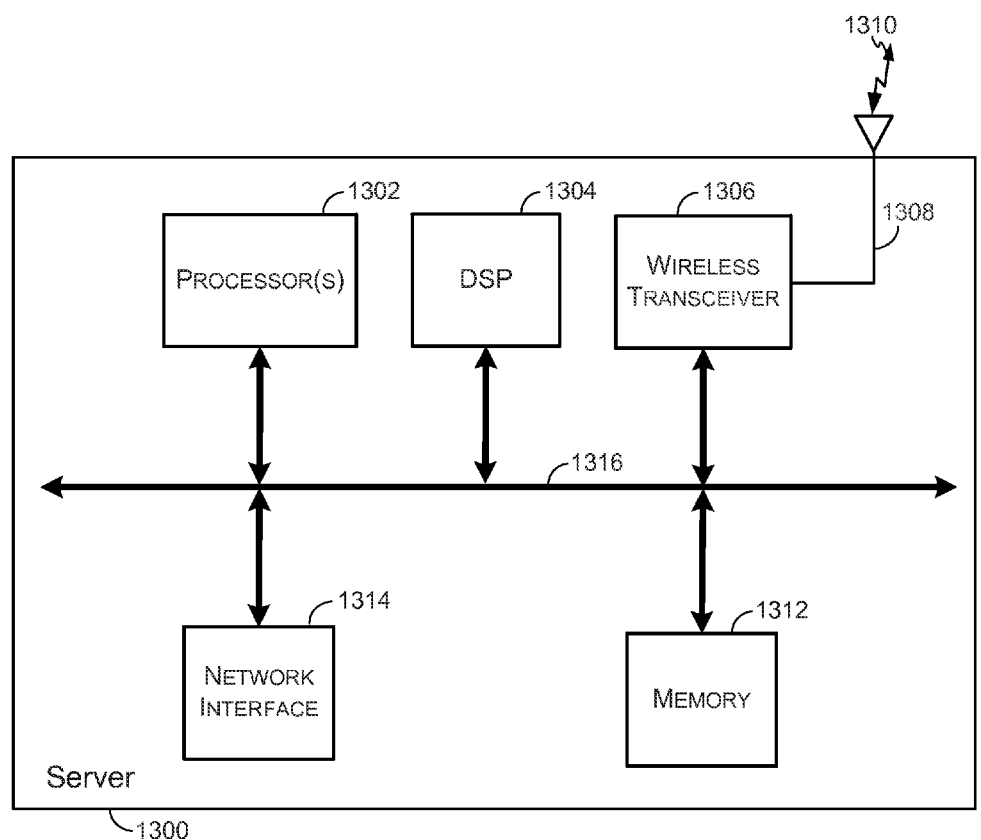
FIG. 13 is a block diagram illustrating an example of a server, in accordance with some embodiments.
Figure 14:
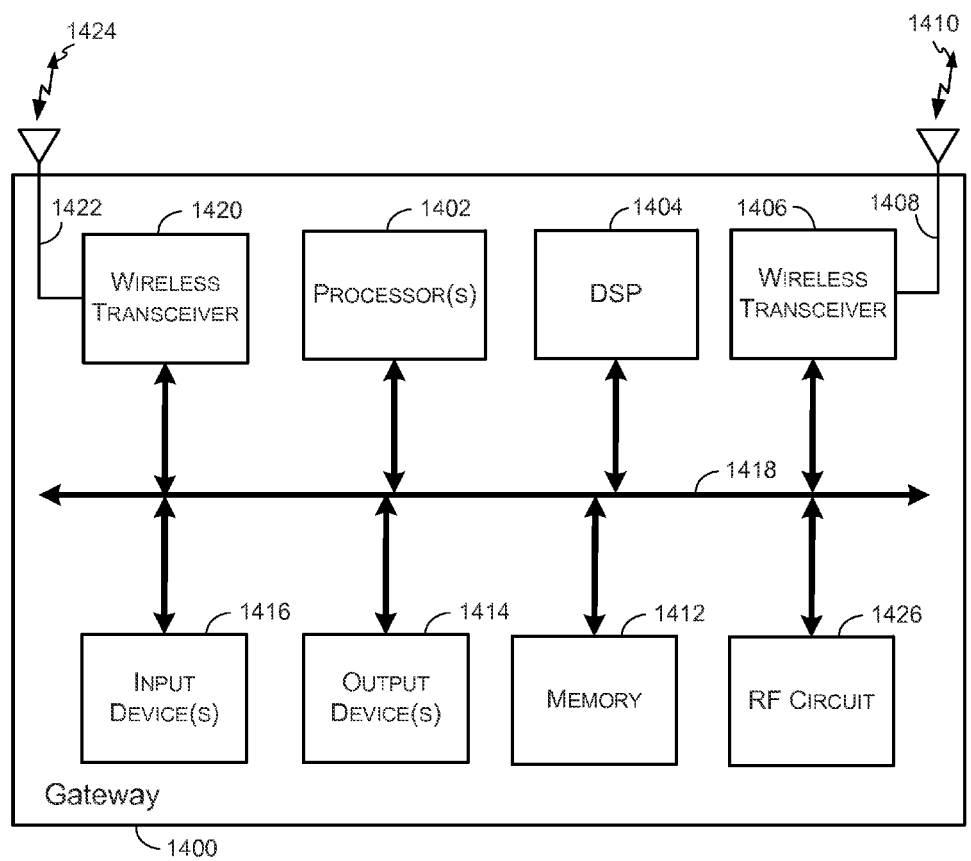
FIG. 14 is a block diagram illustrating an example of a gateway, in accordance with some embodiments.

FIG. 13 illustrates an example of a server 1300. The server 1300 includes hardware elements that can be electrically coupled via a bus 1316 (or may otherwise be in communication, as appropriate). In one embodiment, the bus 1316 can be used for the processor(s) 1302 to communicate between cores and/or with the memory 1312. The hardware elements may include one or more processors 1302, including without limitation one or more general-purpose processors and/or one or more special-purpose processors (such as digital signal processing chips, graphics acceleration processors, and/or the like), memory 1312, DSP 1304, a wireless transceiver 1306, a bus 1316, and antenna 1308. Furthermore, in addition to the wireless transceiver 1306, server 1300 can further include a network interface 1314 to communicate with a network (e.g., a local area network, a network of a preferred carrier, Internet, etc.).

The server 1300 may further include (and/or be in communication with) one or more non-transitory machine-readable storage mediums or storage devices (e.g., memory 1312), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1312. The server 1300 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory 1312 may be a non-transitory machine-readable storage medium, processor-readable memory, and/or a computer-readable memory that stores the one or more computer-program products configured to cause the processor(s) 1302 to perform the functions described. In other embodiments, one or more of the functions described may be performed in hardware.

A set of these instructions and/or code might be stored on a non-transitory machine-readable storage medium, such as the memory 1312. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1300 and/or might take the form of source and/or installable code, which, upon compilation and/or installation on the server 1300 (e.g., using any of a variety of generally available compilers, installation programs, compression/decompression utilities, etc.) then takes the form of executable code.

FIG. 11 illustrates an example of a gateway 1100. The gateway 1100 may include a range extending device, a router, an access point, a modem, and/or any other device that provides network access among one or more computing devices and/or external networks. For example, the gateway 1100 may include a router gateway with access point and router functionality, and may further include an Ethernet switch and/or a modem. As another example, the gateway 1100 may include a range extending gateway that may be used to improve signal range and strength within a network by taking an existing signal from another gateway (e.g., a router gateway, an access point, or the like) and rebroadcasting the signal to create a second logical network.

The gateway 1100 includes hardware elements that can be electrically coupled via a bus 1118 (or may otherwise be in communication, as appropriate). In one embodiment, the bus 1118 can be used for the processor(s) 1102 to communicate between cores and/or with the memory 1112. The hardware elements may include one or more processors 1102, including without limitation one or more general-purpose processors and/or one or more special-purpose processors (such as digital signal processing chips, graphics acceleration processors, and/or the like); one or more input devices 1116, which can include without limitation one or more buttons, a keyboard, a keypad, a touch sensitive screen, a touch pad, and/or the like; and one or more output devices 1114, which can include, without limitation, a display, light or sound indicators, and/or the like.

The gateway 1100 may include one or more wireless transceivers 1106 and 1120 connected to the bus 1118. The wireless transceiver 1106 may be operable to receive wireless signals (e.g., a wireless signal 1110) via an antenna 1108. The wireless transceivers 1120 may be operable to receive wireless signals (e.g., a wireless signal 1114) via an antenna 1122. The wireless transceivers 1106 and 1120 may each include a WiFi transceiver radio designed to transmit and receive signals using frequencies of a specific frequency band, which may be referred to herein as "WiFi circuits." For example, wireless transceiver 1106 may include a 2.4 GHz WiFi circuit, and wireless transceiver 1120 may include a 5 GHz WiFi circuit. Accordingly, the gateway 1100 may include a single WiFi circuit for a first WiFi frequency band, and a single WiFi circuit for a second WiFi frequency band. In some embodiments, the gateway 1100 may include multiple wireless transceivers (not shown) for each available frequency band. The antennas 1108 and 1122 may include multiple band antennas that can transmit and/or receive signals over different frequency bands.

The gateway 1100 may further include radio frequency (RF) circuit 1126. In some embodiments, the wireless transceivers 1106 and 1120 may be integrated with or coupled to the RF circuit 1126 so that the RF circuit 1126 includes the wireless transceivers 1106 and 1120. In some embodiments, the wireless transceivers 1106 and 1120 and the RF circuit 1126 are separate components. The RF circuit 1126 may include a RF amplifier that may amplify signals received over antennas 1108 and 1122. The RF circuit 1126 may also include a power controller that may be used to adjust signal amplification by the RF amplifier. The power controller may be implemented using hardware, firmware, software, or any combination thereof.

The wireless signals 1110 and 1124 may be transmitted via a wireless network. In some embodiments, the wireless network may be any wireless network such as a wireless local area network (e.g., local area network 100), such as WiFi™, a Personal Access Network (PAN), such as Bluetooth®, Zigbee®, or UWB, or a cellular network (e.g. a GSM, WCDMA, LTE, CDMA2000 network). Wireless transceivers 1106 and 1120 may be configured to receive various radio frequency (RF) signals (e.g., signals 1110 and 1124) via antennas 1108 and 1124, respectively, from one or more other gateways, access devices, network devices, cloud networks, and/or the like. Gateway 1100 may also be configured to decode and/or decrypt, via the DSP 1104 and/or processor(s) 1102, various signals received from one or more gateways, network devices, cloud networks, and/or the like.

The gateway 1100 may include a power supply (not shown) that can power the various components of the gateway 1100. The power supply may include a switch-mode power supply, a linear power supply, a push-pull power supply, or any other suitable type of power supply. In some embodiments, the gateway 1100 may include multiple power supplies. For example, a switch-mode power supply may be used to condition input power, and a linear power supply may be used to power the RF circuit 1126. The power supply may be configured to operate over various ranges of appropriate input voltages.

The gateway 1100 may further include (and/or be in communication with) one or more non-transitory machine-readable storage mediums or storage devices (e.g., memory 1112), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1112, such as RAM, ROM, FLASH, or disc drive, and executed by processor(s) 1102 or DSP 1104. The gateway 1100 can also comprise software elements (e.g., located within the memory 1112), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 2, 6 and/or 7, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 2, 6 and/or 7. The memory 1112 may be a non-transitory machine-readable storage medium, processor-readable memory, and/or a computer-readable memory that stores the one or more computer-program products configured to cause the processor(s) 1102 to perform the functions described. In other embodiments, one or more of the functions described may be performed in hardware.

A set of these instructions and/or code might be stored on a non-transitory machine-readable storage medium, such as the memory 1112. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 1100 and/or might take the form of source and/or installable code, which, upon compilation and/or installation on the gateway 1100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

It will be appreciated that, while some disclosures herein reference a house or a household, such disclosures can be extended to apply to different settings, such as a building, an office, an apartment, a school, or a vehicle.

While illustrative embodiments of the application have been described in detail herein, it is to be understood that the inventive concepts may be otherwise variously embodied and employed, and that the appended claims are intended to be construed to include such variations, except as limited by the prior art.

EXAMPLES

Example 1

A user can interact with an app on a mobile phone to define a "working from home" context and can indicate that noise is to be inhibited in such context. A user can indicate that he may be working from home during normal work hours from a home office. A series of light detectors can monitor light and motion throughout a house and outside a front of a home. Further, a series of door detectors can monitor whether each of a variety of homes are closed or open. A rule can be generated to infer (e.g., at the cloud network) the context when motion is detected in a room designated as a home office during the hours of 8 am-6 pm. Upon such detection, signals to sprinkle, dehumidifier, air-purifier and doorbell devices can be sent to temporarily deactivate the devices. Further, a notification of such inference and consequence can be sent to the user's phone. The user can indicate when such inference is erroneous and/or when a consequence is undesired, and the rule can then be modified. For example, the rule can be modified to require sensing a vehicle in a particular parking spot and requiring detection of a door of the home office room being closed before inferring that the user is working from home.

Example 2

A user can indicate that a small child is living in a house and identify one or more devices located in the child's bedroom. A system can proceed to develop a rule associated with a sleep schedule of the child. Initially, light, motion and device interactions can be monitored. In time, the system can associate reduced interactions (or suppressing interactions) with noisier or light devices with particular times. A rule can thus be developed that infers that a child normally wakes up around 7 am, goes to sleep around 8 pm and takes a nap from 12-3. The rule can also infer that the child is likely to be sleeping when the child's room is darker than ambient brightness (e.g., due to shades being drawn) and when a door to the room is closed. The rule can weight factors such as activity preceding a sleep interval (e.g., to indicate that a family was home), darkness and time to arrive at a final inference.

During learning, messages can be presented to a user on an access or network device to request verification of estimates as to whether the child is asleep. A same or different rule can identify device controls (e.g., quieting or muting doorbells, phone speakers, security-system alerts, etc.) to be implemented during a child-sleeping context. Controls can include those as identified by a user, those consistent with controls identified by the user, those performed by a user during a confirmed or inferred child-sleeping context or those consistent with controls identified by the user. When a child-sleeping context is inferred, a notice of controls to be implemented can be sent of an access device, which can present the notice with an option to block one or more controls. If no such block is received, the devices can be controlled accordingly.

Example 3

A user interacts with a network device and indicates that there are four household members living in a house. Light detectors and power-usage detectors are positioned across the house. Data detected by the devices can be used to infer which rooms have at least one occupant and a number of occupants. Thus, an inference as to a total number of occupants in the house can be made. Further, using data from a light detector positioned to detect light from outside, it can be inferred whether and when someone is approaching a house. When it is inferred that all household members are inside a house, an alert can be sent to a user's phone to alert the user of the guest and/or to a security system to activate the system.

Example 4

A first device emits a light indicative of maintenance status (e.g., maintenance needed, operation questionable, error) or resource status (e.g., of a charge or light source). The light can be indicative of a property the first device or of another device. In one instance, a light switch estimates a time before a light bulb will burn out. A light detector positioned near the emission monitors the emission. Particular detections (e.g., indicating maintenance needed or low remaining resource) can cause a second device that controls power to the first device to reduce or stop the power provided to the first device (e.g., to conserve resources or prevent improper device functioning).

Example 5

A series of light detectors are positioned across a house. The light detectors can be positioned to detect whether various rooms' lights are turned on. Each light detector can communicate its data to a server in the cloud network. Further, other devices (e.g., those including or attached to) an alarm clock, coffee maker, iron, house stereo, HVAC, security system and vehicle preheater can also send transmission to the server to indicate when such device are turned off and on. The server can learn common patterns in light changes. The patterns can correspond to a user moving across the house (such that the user is actively turning lights on during the movement or such that lights are automatically turned on). The server can further learn how device operations relate to the patterns. For example, one pattern can include activation of an alarm clock in Bedroom #1, followed by successive light activations from Bedroom #1 to the kitchen, followed by turning on a coffee maker. Another pattern can include activation of a light in Bathroom #2 in a morning, followed by successive light activations from Bathroom #2 to the front door, followed by turning on a security system. In some instances, an estimate is made for each of one or more path as to which user the path corresponds to (e.g., based on an originating or final room), such that preferences for the user can further be used to identify common patterns and device-control objectives.

Once a pattern is learned, the pattern can be precipitated (e.g., by turning on lights in anticipation of a user entering a room, turning on a coffee maker after detecting a change in power consumed by an alarm clock, activating a security system after detecting that a user has arrived through a learned path at a front door). In some alternative or additional instances, such pattern assistance can be proposed to a user as a rule to implement.

Example 6

One or more light detectors detect light inside or outside a home. Data from inside detectors can be, for example, low-pass filtered to reduce influence on artificial lighting. The data are processed (e.g., at a network device, at a server on the cloud network or at a gateway) to estimate a dusk or darkness time. Signals are sent to network devices to, e.g., turn on one or more inside and/or outside lights, shut curtains, turn on a laundry machine, turn on a sprinkler, turn on a dishwasher, and/or turn on a robotic cleaning (e.g., vacuuming) device.

Example 7

A light detector is located near a window and positioned to detect light outside. A learning technique is used to identify characteristics of common outside arrival characteristics. For example, for each of one or more learned arrival, a characteristic can include a detected vehicle size, stationary vehicle position (parking spot), vehicle arrival time, headlight color, and/or headlight size. When a new vehicle is detected, a detector device estimates whether the new vehicle corresponds to a common vehicle. If so, control signals are sent to home devices to, e.g., de-activate a security system, adjust an internal temperature and turn on indoor and porch lights. Further, a notification is sent to a home or mobile user device with an alert of the arrival (e.g., and a time and estimated identity of arriving person(s)). If the new vehicle does not correspond to a common vehicle, control signals are sent to home devices to, e.g., active a security system. A notification is further sent to a home or mobile user device with an alert of the arrival and an indication of a potential security concern (e.g., and an option to override the security activation).

Example 8

Data from a light detector can be processed to estimate whether a detected light signal corresponds to a flashlight (e.g., based on a size and color of the light and a time). When it is estimated that the light does correspond to a flashlight, a signal can be sent to a security system to issue an alarm.

Example 9

Based on light-detector data, it is determined that a light is on in a room and that there has not been any motion for a period of time. Determining that the light is on in the room can include distinguishing detected light from daylight (e.g., expected at a given time) and from light originating from a neighboring room. In response to the determination, a signal is sent to one or more devices (which can include a device in a room with detected motion, a mobile device and/or another or same light detector) to present a notification indicative of an estimate that a light has been inadvertently left on.

Example 10

Each of a set of power-monitoring detector devices communicating with a gateway can monitor power usage associated with the device itself or another device. A server communicating with the gateway can track cumulative usages for the gateway and assign thresholds for low usage and high usage (e.g., by identifying a value for which a particular percentage of monitored cumulative power usages were below the value). Real-time cumulative power usages can be tracked to determine whether it is characterized of low, medium or high usage. A signal can be sent to each power-monitoring device indicating the characterization, and the device can then present a light with a color indicative of the usage category. Using such technique, a person in one room in a household can be alerted as to potentially concerning power usage even if it is attributable to a device in another room.

Example 11

A weight sensor in a house's laundry washing machine can detect that the machine is loaded with clothes. A series of flow detectors in the house's bathrooms can detect when a shower is in use. A rule can infer a shower use when an above-threshold flow is detected for at least a defined time period. When a number of inferred showers matches a number of household members or a normal number of inferred morning showers, it can be inferred that a household has completed all of their morning showers. A signal can then be sent to the washing machine to start a washing cycle.

Example 12

A weight sensor in a house's dishwasher can detect that the machine is loaded with clothes. A power detector in a family room can detect when a television is on, and a light detector in the family room can detect when a light (e.g., an artificial light or light from the television) is on. A rule can weight and combine data from the detectors to infer whether a person is using the family room. When it is after a time point associated with an electricity or water discount (e.g., as identified by a user or automatically obtained from an electricity or water provider) and if it is inferred that no person is in the family room, a signal can be sent to the dishwasher to start a cycle.

Example 13

A set of light- and motion-detecting devices are positioned in various rooms in a house. The devices can sequentially detect movement beginning near a front door and ending in a teenager's bedroom. Using the data, a gateway device can make an inference that the teenager arrived home at 11 pm. The gateway device can transmit the inference to a light detector in a parent's bedroom, which can then emit a stimulus with "11 pm" text in a color representative of the teenager's identity.

Example 14

A set of inter-communicating temperature detecting devices are positioned in various rooms in a house. At least one of the devices can present a simplified map of the house can be portrayed on a surface of the device. Representations of rooms with temperature-detecting devices can be colored to reflect the detected temperatures.

What is claimed is:

1. A computer-implemented method comprising:
receiving, at a performing network device, a plurality of environmental data points from a plurality of other network devices, wherein:
at least two of the plurality of environmental data points correspond to measurements of different types of environmental stimuli; and
each of the performing network device and the plurality of other network devices is part of a same network;
accessing, from a local storage at the performing network device, a rule that relates environmental data inputs to inference outputs, wherein a corresponding rule is also stored at each of at least one of the plurality of other network devices such that each of the at least one of the plurality of other network devices is enabled to generate an inference output based on environmental data inputs;
generating an inference using the rule and the plurality of environmental data points;
identifying a notification or device control based on the inference;
facilitating a presentation of the notification or a device operation in accordance with the device control;
facilitating an inference-identifying presentation identifying the inference, the inference-identifying presentation including an option to confirm or reject the inference;
receiving an input indicating whether the inference was confirmed; and
modifying the rule based on the input.

2. The method as recited in claim 1, wherein the rule is adaptive such that it is modified in accordance with a learning technique that processes manual device operation controls.

3. The method as recited in claim 1, wherein identifying the notification or device control includes identifying the notification, and wherein facilitating the presentation of the notification or a device operation in accordance with the device control includes facilitating the presentation of the notification.

4. The method as recited in claim 1, wherein facilitating the presentation of the notification or a device operation in accordance with the device control includes transmitting a communication to an affected device, wherein the affected device is part of the same network and is different than each of the plurality of other network devices.

5. The method as recited in claim 1, wherein facilitating the presentation of the notification or a device operation in accordance with the device control includes:
presenting, at the performing network device, the notification; or
effecting an operation, at the performing network device, in accordance with the device control.

6. The method as recited in claim 1, wherein each of two or more of the plurality of other network devices is located in a different area of a building.

7. The method as recited in claim 1, wherein generating the inference includes inferring that a person is asleep or going to sleep.

8. The method as recited in claim 1, wherein generating the inference includes inferring that a person is at a premise, is not at a premise, is leaving a premise or is arriving at a premise.

9. A system comprising:
one or more data processors; and
a non-transitory computer readable storage medium containing instructions which when executed on the one or more data processors, cause the one or more data processors to perform actions including:
receiving a plurality of environmental data points from a plurality of other network devices, wherein:
at least two of the plurality of environmental data points correspond to measurements of different types of environmental stimuli; and
each of the system and the plurality of other network devices is part of a same network;
locally accessing a rule that relates environmental data inputs to inference outputs, wherein a corresponding rule is also stored at each of at least one of the plurality of other network devices such that each of the at least one of the plurality of other network devices is enabled to generate an inference output based on environmental data inputs;
generating an inference using the rule and the plurality of environmental data points;
identifying a notification or device control based on the inference;
facilitating a presentation of the notification or a device operation in accordance with the device control;
facilitating an inference-identifying presentation identifying the inference, the inference-identifying presentation including an option to confirm or reject the inference;
receiving an input indicating whether the inference was confirmed; and
modifying the rule based on the input.

10. The system as recited in claim 9, wherein the rule is adaptive such that it is modified in accordance with a learning technique that processes manual device operation controls.

11. The system as recited in claim 9, wherein identifying the notification or device control includes identifying the notification, and wherein facilitating the presentation of the notification or a device operation in accordance with the device control includes facilitating the presentation of the notification.

12. The system as recited in claim 9, wherein facilitating the presentation of the notification or a device operation in accordance with the device control includes transmitting a communication to an affected device, wherein the affected device is part of the same network and is different than each of the plurality of other network devices.

13. The system as recited in claim 9, wherein facilitating the presentation of the notification or a device operation in accordance with the device control includes:
presenting, at the system, the notification; or
effecting an operation, at the system, in accordance with the device control.

14. The system as recited in claim 9, wherein each of two or more of the plurality of other network devices is located in a different area of a building.

15. The system as recited in claim 9, wherein generating the inference includes inferring that a person is asleep or going to sleep.

16. The system as recited in claim 9, wherein generating the inference includes inferring that a person is at a premise, is not at a premise, is leaving a premise or is arriving at a premise.

17. A computer-program product tangibly embodied in a non-transitory machine-readable storage medium, including instructions configured to cause one or more data processors to perform actions, at a performing network device, including:
- receiving a plurality of environmental data points from a plurality of other network devices, wherein:
  - at least two of the plurality of environmental data points correspond to measurements of different types of environmental stimuli; and
  - each of the performing network device and the plurality of other network devices is part of a same network;
- locally accessing a rule that relates environmental data inputs to inference outputs, wherein a corresponding rule is also stored at each of at least one of the plurality of other network devices such that each of the at least one of the plurality of other network devices is enabled to generate an inference output based on environmental data inputs;
- generating an inference using the rule and the plurality of environmental data points;
- identifying a notification or device control based on the inference;
- facilitating a presentation of the notification or a device operation in accordance with the device control;
- facilitating an inference-identifying presentation identifying the inference, the inference-identifying presentation including an option to confirm or reject the inference;
- receiving an input indicating whether the inference was confirmed; and
- modifying the rule based on the input.

18. The computer-program product as recited in claim 17, wherein the rule is adaptive such that it is modified in accordance with a learning technique that processes manual device operation controls.

19. The computer-program product as recited in claim 17, wherein identifying the notification or device control includes identifying the notification, and wherein facilitating the presentation of the notification or a device operation in accordance with the device control includes facilitating the presentation of the notification.

20. The computer-program as recited in claim 17, wherein facilitating the presentation of the notification or a device operation in accordance with the device control includes transmitting a communication to an affected device, wherein the affected device is part of the same network and is different than each of the plurality of other network devices.

* * * * *